United States Patent
Igarashi et al.

(10) Patent No.: US 7,260,398 B2
(45) Date of Patent: Aug. 21, 2007

(54) MOBILE COMMUNICATION SYSTEM FOR PERFORMING HAND-OFF BASED ON COMMUNICATION RESOURCES IN BASE STATIONS

(75) Inventors: Hironobu Igarashi, Kawasaki (JP); Katsutoshi Inoko, Kawasaki (JP); Yuji Kuroda, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 277 days.

(21) Appl. No.: 10/373,494

(22) Filed: Feb. 21, 2003

(65) Prior Publication Data
US 2003/0139186 A1  Jul. 24, 2003

Related U.S. Application Data

(63) Continuation of application No. PCT/JP00/06448, filed on Sep. 20, 2000.

(51) Int. Cl.
H04Q 7/20 (2006.01)
(52) U.S. Cl. ............... 455/436; 455/437; 455/438; 455/442; 455/452.1; 455/452.2; 455/453; 370/331; 370/332; 370/333
(58) Field of Classification Search ............... 455/436, 455/437, 438, 442, 443, 450, 451, 452.1, 455/452.2, 453; 370/331, 332, 333
See application file for complete search history.

(56) References Cited

U.S. PATENT DOCUMENTS 4,669,107 A * 5/1987 Eriksson-Lennartsson .. 455/453
5,175,867 A * 12/1992 Wejke et al. ............... 455/439
5,327,575 A    7/1994 Menich et al.
5,432,843 A * 7/1995 Bonta .......................... 455/438
5,491,837 A * 2/1996 Haartsen ....................... 455/62
5,507,008 A    4/1996 Kanai et al.
5,542,097 A * 7/1996 Ward et al. ................. 455/437
5,701,585 A * 12/1997 Kallin et al. ................ 455/437

(Continued)

FOREIGN PATENT DOCUMENTS

EP    1 024 638 A1    8/2000

(Continued)

OTHER PUBLICATIONS

H. Tominaga et al. Point-illustrated Text for Standard ATM. Multimedia Communications Study Group. pp. 50-51 Jun. 11, 1998.

(Continued)

*Primary Examiner*—Steve M. D'Agosta
(74) *Attorney, Agent, or Firm*—Katten Muchin Rosenman LLP

(57) ABSTRACT

Each mobile station is accommodated in a base station through a radio transmission path. A base station control device controls each base station. A mobile station is accommodated in a first base station. Each of the base stations notifies the mobile station of the condition of the communication resources of the base station, respectively. If the mobile station judges that it is advantageous to be accommodated in a second base station instead of the first base station, the mobile station makes a request for hand-off to the base station control device. The base station control device issues a hand-off command to both of the first and second base stations. Then, the mobile station is accommodated in the second base station.

6 Claims, 29 Drawing Sheets

U.S. PATENT DOCUMENTS

| | | | |
|---|---|---|---|
| 5,781,861 | A | 7/1998 | Kang et al. |
| 6,018,662 | A | 1/2000 | Periyalwar et al. |
| 6,256,501 | B1 * | 7/2001 | Tokuyama et al. ........... 455/442 |
| 6,385,449 | B2 * | 5/2002 | Eriksson et al. ............ 455/436 |
| 6,542,742 | B2 * | 4/2003 | Schramm et al. ........... 455/436 |
| 6,574,474 | B1 * | 6/2003 | Nielsen ....................... 455/436 |
| 6,596,492 | B2 * | 7/2003 | Avery et al. .................... 435/6 |
| 6,836,661 | B2 * | 12/2004 | Mohebbi ..................... 455/437 |

FOREIGN PATENT DOCUMENTS

| | | |
|---|---|---|
| GB | 2 266 030 | 10/1993 |
| GB | 2 293 944 | 4/1996 |
| GB | 2 343 089 | 4/2000 |
| JP | 63-185252 | 7/1988 |
| JP | 2-159157 | 6/1990 |
| JP | 3-191623 | 8/1991 |
| JP | 7-322336 | 12/1995 |
| JP | 8-65201 | 3/1996 |
| JP | 8-154269 | 6/1996 |
| JP | 8-289367 | 11/1996 |
| JP | 9-247732 | 9/1997 |
| JP | 10-224847 | 8/1998 |
| JP | 10-341471 | 12/1998 |
| JP | 11-155165 | 6/1999 |
| JP | 11-215545 | 8/1999 |
| JP | 11-252640 | 9/1999 |
| JP | 11285048 | 10/1999 |
| JP | 11-308657 | 11/1999 |
| JP | 11-355829 | 12/1999 |
| JP | 2000-13840 | 1/2000 |
| JP | 2000-31894 | 1/2000 |
| JP | 2000-78653 | 3/2000 |
| WO | WO 99/59253 | 11/1999 |
| WO | 00/35230 | 6/2000 |

OTHER PUBLICATIONS

Holcman, et al., "CDMA Intersystem Operations" Vehicular Technology Conference, Jun. 1994, pp. 590-594 XP010123362, ISBN: 0-7803-1927-3.

Communication pursuant to Article 96(2) EPC dated Sep. 22, 2004.

Communication pursuant to Article 96(2) EPC dated Nov. 15, 2006.

* cited by examiner

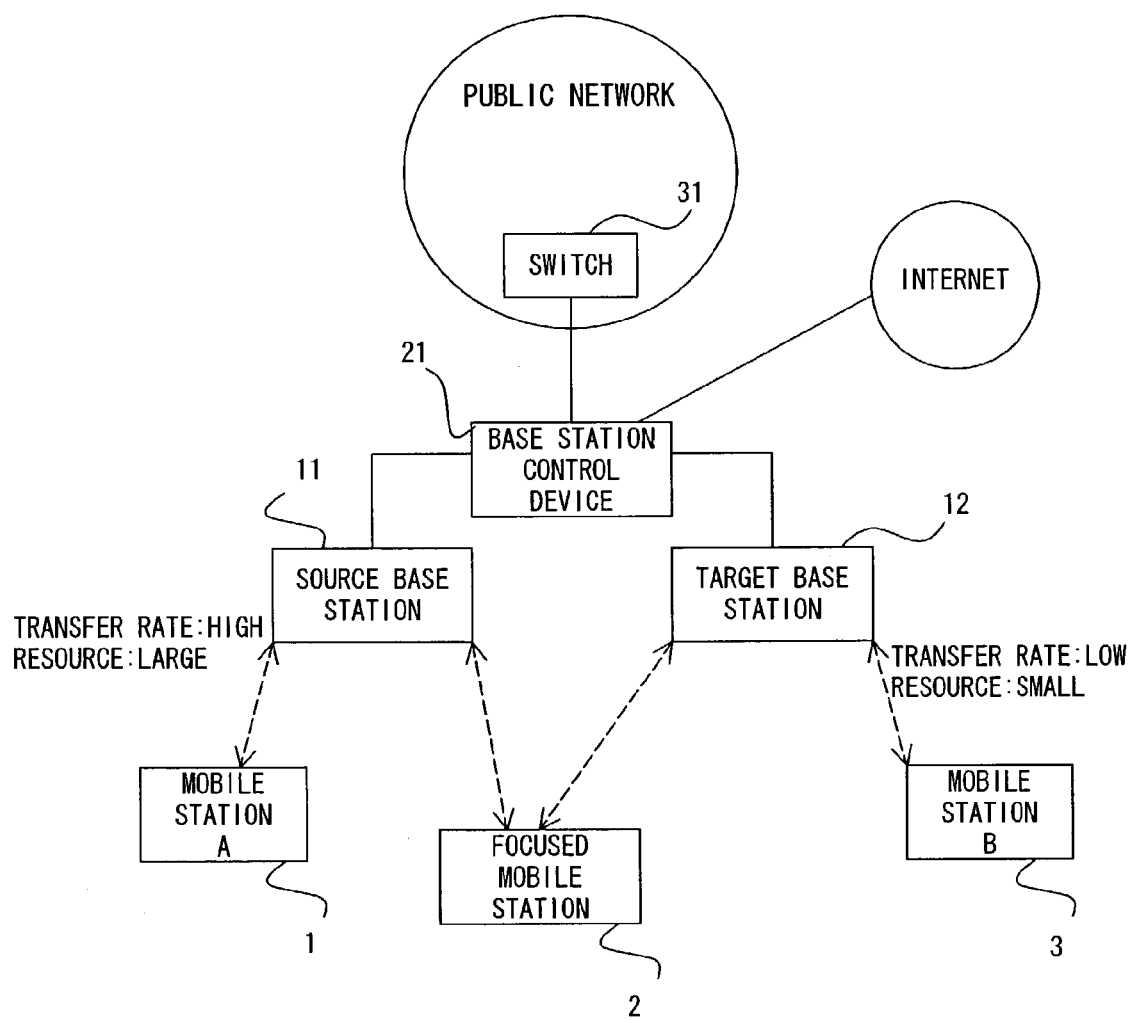
F I G. 1

| RADIO CHANNEL | DATA RATE (bps) | TRANSMITTING POWER (mW) |
|---|---|---|
| ch 1 | 64K | 20 |
| ch 2 | 64K | 20 |
| ch 3 | 128K | 40 |
| ch 4 | 16K | 5 |
| ⋮ | ⋮ | ⋮ |

F I G. 3

| MODULATOR ID | RADIO CHANNEL |
|---|---|
| MOD-1 | ch 1 |
| MOD-2 | ch 2 |
| MOD-3 | UNUSED |
| MOD-4 | ch 3 |
| MOD-5 | UNUSED |
| MOD-6 | ch 4 |
| ⋮ | ⋮ |
| MOD-N | |

F I G. 4

| SPREADING CODE | RADIO CHANNEL |
|---|---|
| CODE 1 | ch 1 |
| CODE 2 | ch 2 |
| CODE 3 | UNUSED |
| CODE 4 | ch 3 |
| . . . . | . . . . |

F I G. 5

| DEMODULATOR ID | RADIO CHANNEL |
|---|---|
| DMOD-1 | ch 1 |
| DMOD-2 | ch 2 |
| DMOD-3 | ch 3 |
| DMOD-4 | UNUSED |
| DMOD-5 | ch 4 |
| DMOD-6 | UNUSED |
| ⋮ | ⋮ |
| DMOD-N | ⋮ |

F I G. 6

| DECODER ID | RADIO CHANNEL |
|:---:|:---:|
| DEC-1 | ch 1 |
| DEC-2 | ch 2 |
| DEC-3 | ch 3 |
| DEC-4 | UNUSED |
| DEC-5 | ch 4 |
| ⋮ | ⋮ |

F I G. 7

| RADIO CHANNEL | FRAME-OFFSET |
|---|---|
| CH 1 | 2 |
| CH 2 | 16 |
| CH 3 | UNUSED |
| CH 4 | 1 |
| ⋮ | ⋮ |

F I G. 8 A

| CHANNEL | BAND |
|---|---|
| CH 1 | 100 |
| CH 2 | 100 |
| CH 3 | 200 |
| CH 4 | 50 |
| ⋮ | ⋮ |

F I G. 8 B

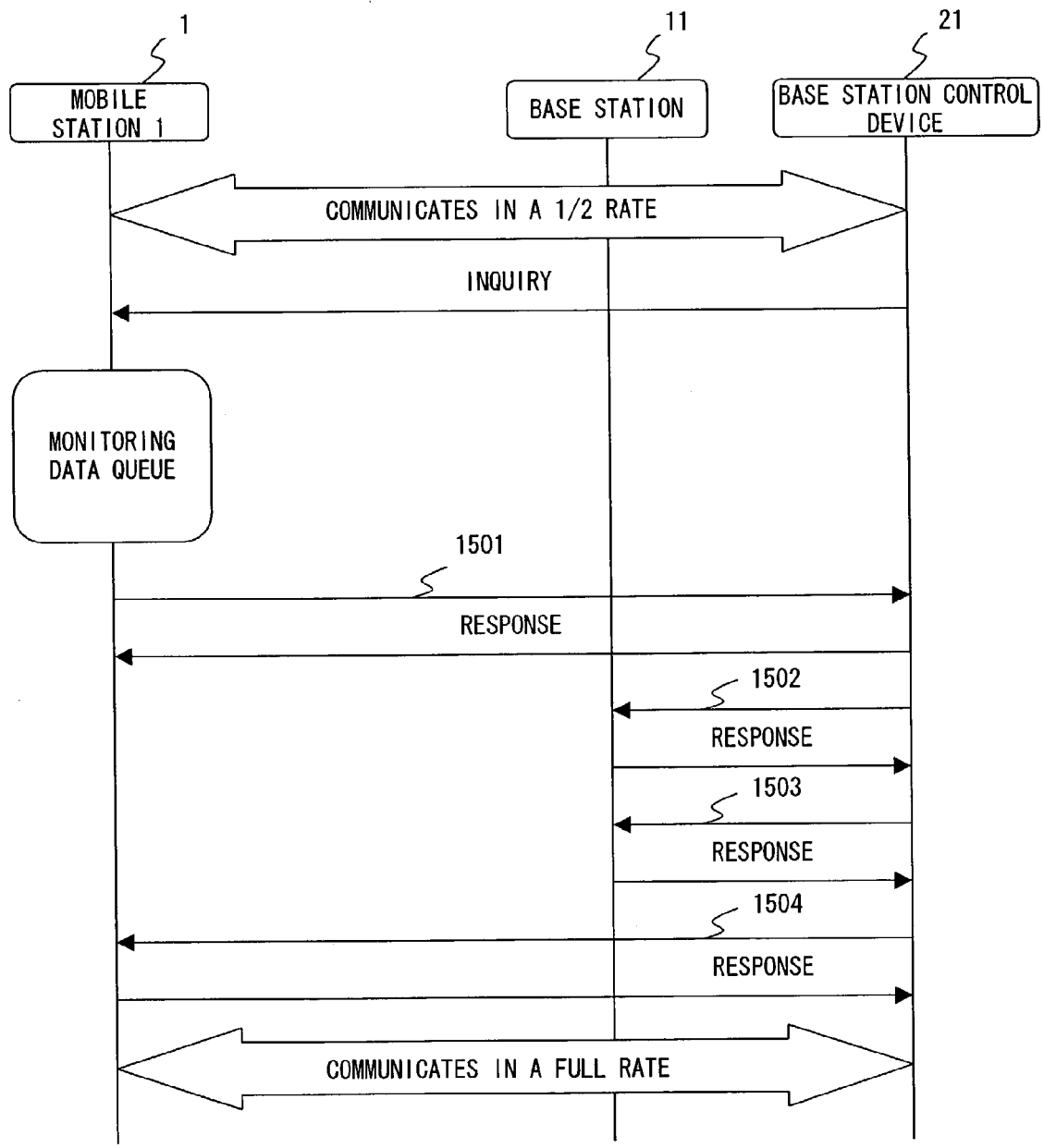
F I G. 1 5

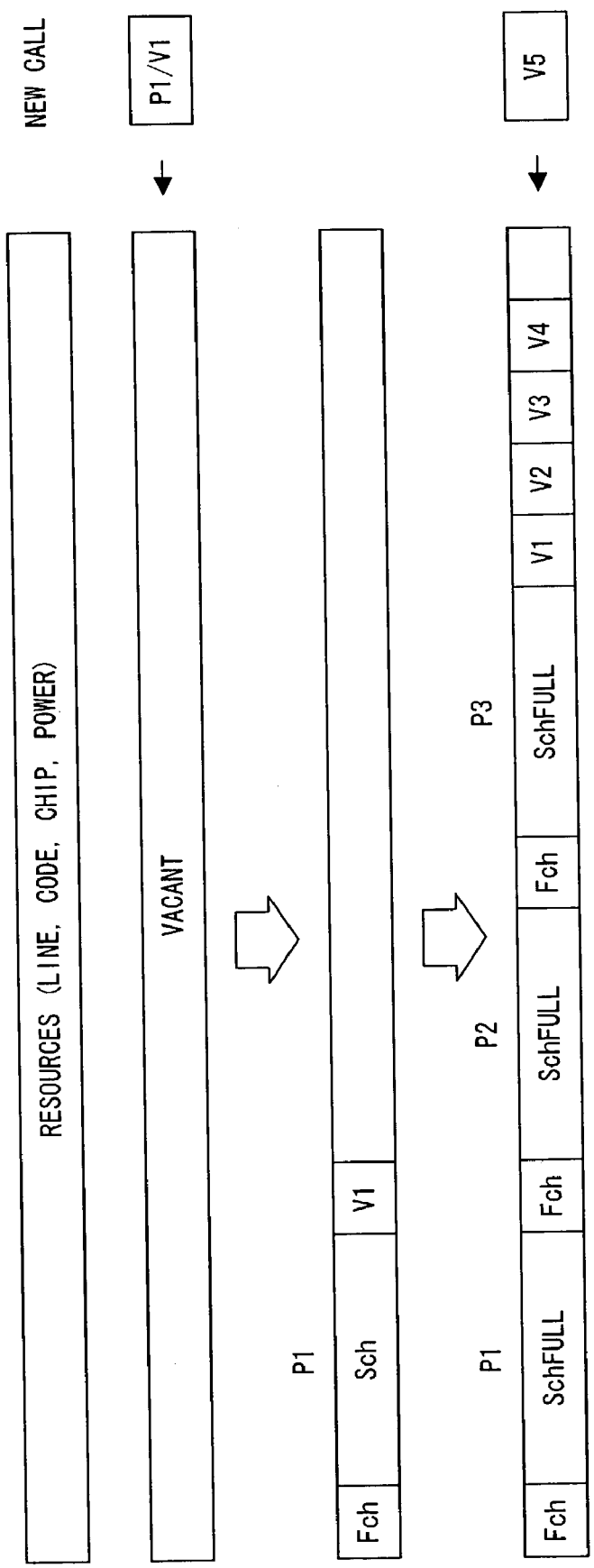
F I G. 17

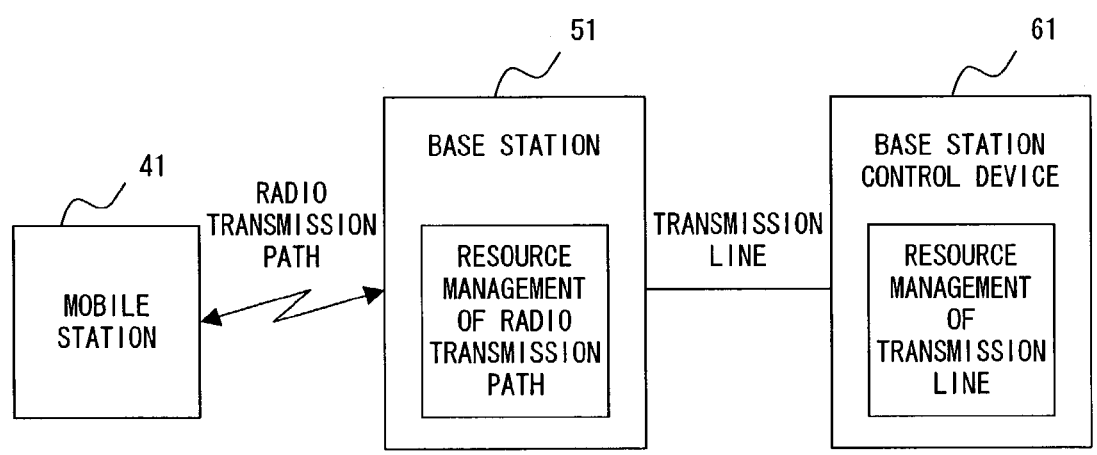
F I G. 2 1

MOBILE COMMUNICATION SYSTEM FOR PERFORMING HAND-OFF BASED ON COMMUNICATION RESOURCES IN BASE STATIONS

CROSS REFERENCE TO RELATED APPLICATION

This application is a continuation application of an International Application of PCT/JP00/06448, which was filed on Sep. 20, 2000.

BACKGROUND OF THE INVENTION

1. Field of the Invention

The present invention relates to a mobile communication system and in particular, relates to a mobile communication system adopting CDMA.

2. Description of the Related Art

Recently, mobile communications have widely spread. In a mobile communication system, each mobile station is accommodated in the nearest base station and is connected to a network through the base station. In this case, since each base station accommodates as many subscribers as possible, usually radio signals are multiplexed when transmitted. For the multiplex method of radio signals, conventionally, Frequency-Division Multiple Access (FDMA) or Time-Division Multiple Access (TDMA) is adopted. However, in the next generation system, Code-Division Multiple Access (CDMA) is anticipated to become mainstream.

In CDMA, each channel is identified by a code. Specifically, when transmitting a signal, a transmitter (mobile station or base station) spreads the spectrum of the signal by multiplying the signal by a specific code. Then, a receiver (base station or mobile station) decodes the signal by multiplying an incoming signal by the same code as that used by the transmitter. Therefore, in CDMA, a specific frequency band is shared by a plurality of channels.

In a mobile communication system, generally, hand-off (or hand-over) is performed. Hand-off means to change the base station accommodating a mobile station from a source base station to a target base station when the mobile station accommodated in a specific base station (the source base station) travels to the communications area of another base station (the target base station). In this case, whether hand-off should be performed is decided, for example, based on the power of an incoming radio signal at the mobile station. In this case, if the power of a signal from the source base station at the mobile station drops below a specific threshold value and simultaneously if the power of a signal from the target base station exceeds a specific threshold value, hand-off is performed.

Although currently a mobile communication system is mainly used for voice communications, it is predicted that the amount of data communications will become high in the future. Voice communications are conducted at low and most often constant speed, while data communications are conducted at high and variable speed. Therefore, if a hand-off method presuming voice communications is adopted in a mobile communication system mainly used for data communication, there is a possibility that a variety of inconveniences may occur. In addition, if a communication resource management method presuming voice communications is adopted in a mobile communication system mainly used for data communication, there is a possibility that communication resources will not be efficiently used.

However, neither a detailed hand-off method for data communications (packet data communications and the like) nor a detailed communication resource management method for data communications have been proposed. In particular, such methods have not been proposed in a mobile communication system adopting CDMA.

SUMMARY OF THE INVENTION

An object of the present invention is to provide both a hand-off method and a communication resource management method in a mobile communication system taking data communications into consideration.

The mobile communication system of the present invention comprises: a first base station accommodating a mobile station through a radio transmission path; a second base station communicative with the mobile station through a radio transmission path; and a judgment unit for judging whether to perform hand-off, based on the usage of the communication resources of the first and second base stations.

In this system, whether to perform hand-off is determined based on the usage of the communication resources of each base station. Specifically, a base station for accommodating the mobile station is determined based on the usage of the communication resources of each base station. Therefore, the mobile station is accommodated, for example, in the base station that can provide the most communication resources and high-speed communications becomes available accordingly.

The mobile communication system in another aspect of the present invention is provided with a base station accommodating a plurality of mobile stations, the mobile communication system comprises: a detection unit for detecting a call originating from a mobile station accommodated in the base station; an acquisition unit for obtaining communication resources to be allocated to the call; and a rate adjustment unit for reducing the data rate of another mobile station communicating through the base station if the communications resource to be allocated to the call cannot be obtained.

In this system, when a certain mobile station originates a call, the data rate of another mobile station is reduced if necessary. In this way, communication resources to be allocated to the mobile station which originates the call can be secured. The data rate of another mobile station can not only be adjusted using a call originating from a certain mobile station as a trigger, but it can also be increased when the call of a certain mobile station is released. Alternatively, when there is delay in communications of a certain mobile station, the data rate of the mobile station can be improved.

In the mobile communication system in another aspect of the present invention, a mobile station and a base station are connected via a radio transmission path, and the base station and a base station control device are connected via a transmission line. The mobile communication system comprises: a notification unit for periodically notifying the base station control device of the usage of the communication resources of the radio transmission path from the base station; a determination unit for determining the communications resource of a radio transmission path and the communications resource of a transmission line to be allocated to the mobile station based on the notice; and an allocation unit for allocating the communications resource of the radio transmission path and the communications resource of the transmission line to the mobile station based on the determination.

In this system, the usage of the communication resources of the radio transmission path to be managed by the based station is periodically informed to the base station control device. Therefore, the base station control device can allocate transmission line resources corresponding to the radio resources that the base station can allocate to the mobile station to the mobile station. In this way, radio resources and transmission line resources are never maintained unbalanced and the ineffective use of communication resources can be avoided.

BRIEF DESCRIPTIONS OF DRAWINGS

FIG. 1 shows the configuration of the mobile communication system of the present invention.

FIG. 3 shows an example of a transmitting power management table.

FIG. 4 shows an example of a modulator management table.

FIG. 5 shows an example of a spreading code management table.

FIG. 6 shows an example of a demodulator management table.

FIG. 7 shows an example of a decoder management table.

FIG. 8A shows an example of a frame-offset management table.

FIG. 8B shows an example of a band management table.

FIG. 15 is a sequence chart showing a process for adjusting data rate when there is delay in an upstream transmission line.

FIGS. 17 through 20 show specific examples of the rate adjustment method of the mobile communication system in the second embodiment.

FIG. 21 shows the communications resource management of the mobile communication system in the third embodiment.

DESCRIPTION OF THE PREFERRED EMBODIMENT

First Embodiment

Figure 2:
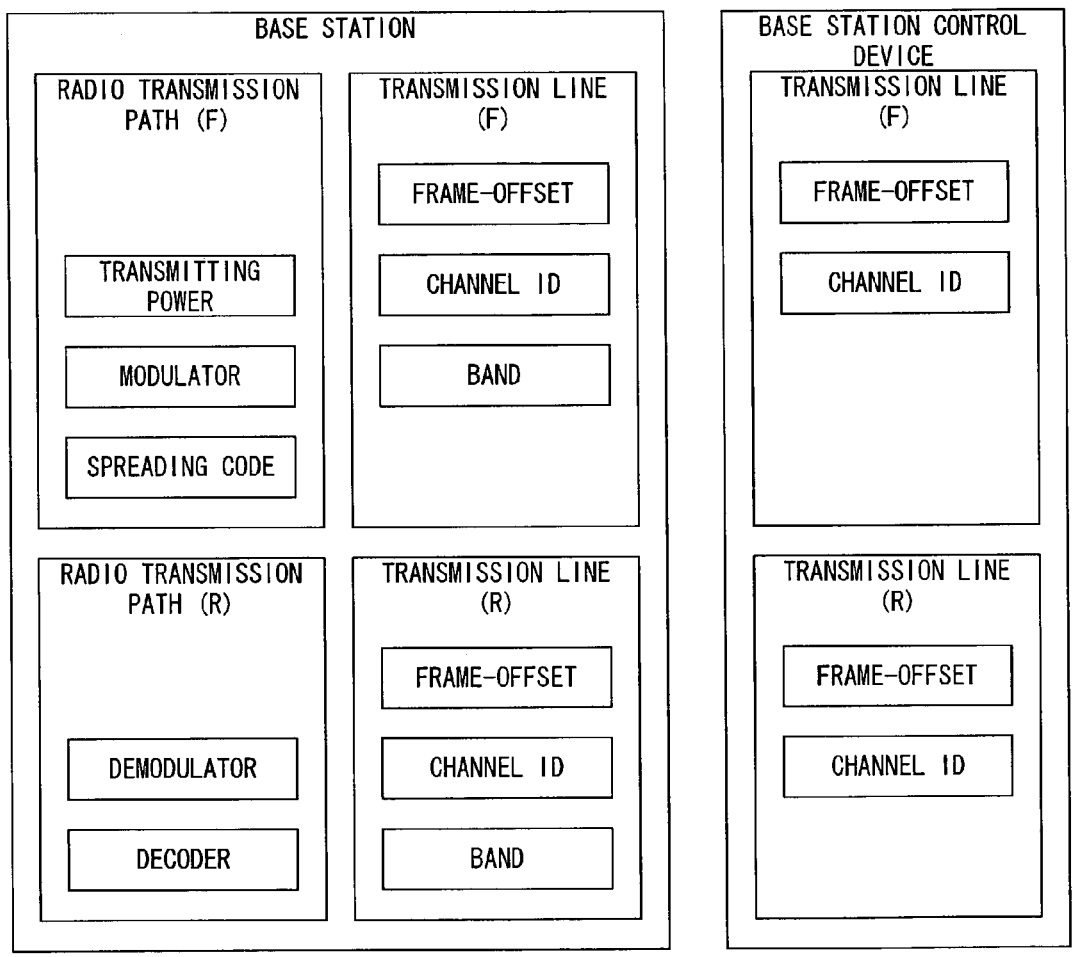
FIG. 2 shows communication resources managed by the base station and base station control device.

FIG. 1 shows the configuration of the mobile communication system of the preferred embodiment. Note that FIG. 1 shows only devices directly related to the present invention.

Mobile stations 1 through 3 are portable terminal devices, such as a telephone set, a PDA, a personal computer and the like. Each of the mobile stations 1 through 3 comprises an interface establishing a radio transmission path with one or more base stations and transmits/receives signals to/from the base station through the radio transmission path.

Base stations 11 and 12 each comprise an interface establishing a radio transmission path with each of the mobile stations 1 through 3 and accommodates the mobile stations 1 through 3. Each of the base stations 11 and 12 is connected to a base station control device 21 through a transmission line, and their operation is controlled by the base station control device 21. Here, although the transmission line is basically an optical fiber cable, a metal cable or the like, it can be a radio transmission path.

The base station control device 21 controls the base stations 11 and 12, and connects each base station to a network. The base station control device 21 is connected to an arbitrary switch 31 in the network.

In this way, each of the mobile stations 1 through 3 is connected to a network through the base station and the base station control device. In other words, each of the mobile stations 1 through 3 is connected to a network through a radio transmission path and a transmission line. In this embodiment, signals are multiplexed using CDMA in a radio transmission path and they are multiplexed using TDM in a transmission line.

Next, the hand-off operation is described. In an existing mobile communication system, hand-off is performed, for example, when a mobile station accommodated by a certain base station travels to the communications area of another base station. For example, in FIG. 1, if the mobile station 2 accommodated in the base station 11 travels to the communications area of the base station 12, the mobile station 2 can transmit/receive signals to/from the base station 12. In this case, if the power of the radio signal from the base station 11 drops below a threshold value and simultaneously the power of the radio signal from the based station 12 exceeds a threshold value, hand-off is performed. Then, the mobile station 12 is accommodated by the base station 12 after that. In this way, in the existing system, whether to perform hand-off is judged based on the power of a radio signal.

However, in the system of the embodiment, whether to perform hand-off is judged based on the following parameters:

1a: Level of a radio signal from a base station at a mobile station

1b: Level of a radio signal from a mobile station at a base station

2a: Quality of a radio transmission path for transmitting signals from a base station to a mobile station 2B: Quality of a radio transmission path for transmitting signals from a mobile station to a base station 3: Usage of communication resources managed by a base station and/or a base station control device In this case, each of the "Level" described in 1a and 1b can be obtained by monitoring the amplitude or power of a radio signal. "Quality" described in 2a and 2b can be obtained by monitoring, for example, a bit error rate or frame error rate. The parameter 3 will be described in detail later.

Next, the concept of hand-off in the mobile communication system of the embodiment is described. In FIG. 1, it is assumed that the communication area of the base station 11 and that of the base station 12 overlap each other and that the mobile station 2 can transmit/receive radio signals to/from each of the base stations 11 and 12. It is also assumed that the mobile station 2 is currently being accommodated in the base station 11.

In the situation described above, if many of the communication resources of the base station 11 are being used by other communications, the communication resources allocable to the mobile station 2 decreases. For example, as shown in FIG. 1, if the mobile station 1 being accommodated in the base station 11 starts high-speed communications, the communication resources allocable to the mobile station 2 decreases. In this case, the mobile station 2 must, for example, reduce the transmission speed.

In this case, it is assumed that there is much of available communication resources left in the base station 12. That is to say, it is assumed that there are much of communication resources allocable to the mobile station 2 left in the base station 12. In this case, in the system of this embodiment, hand-off is performed, and the mobile station 2 becomes accommodated in the base station 12. Then, the mobile station 2 can perform high-speed communications by using the communication resources of the base station 12.

In this way, in the mobile communication system of this embodiment, whether to perform hand-off is decided based on the communication resources (including the communication resources of a radio transmission path and those of a transmission line) of a base station. In this case, as a matter of fact, the power of an incoming radio signal is also considered. Instead of the power of the radio signal, the quality of a radio transmission path can also be considered. Alternatively, both the power of the radio signal and the quality of a radio transmission path can be considered.

FIG. 2 shows communication resources managed by a base station and a base station control device. In FIG. 2, "F (forward)" and "R (reverse)" represent a direction from a network to a mobile station (downstream direction) and a direction from a mobile station to a network (upstream direction), respectively.

A "transmitting power" is a power used by a base station to transmit a radio signal to a mobile station. Here, a base station multiplexes and transmits a plurality of signals. Therefore, the total transmitting power of a base station is the sum of the respective transmitting powers of individual radio signals. However, the maximum total transmitting power of a base station is predetermined, for example, by a variety of regulations. Therefore, if a large transmitting power is allocated to a certain radio signal, there is only a small amount of transmitting power left to be allocated to another radio signal.

As well known, in CDMA, the transmitting power of a radio signal is proportional to the data rate (communications rate) of data being transmitted using the signal. In other words, although low speed communications require only a small amount of transmitting power, high-speed communications require a large amount of transmitting power. If a base station accommodates many mobile stations, the amount of transmitting power allocable to a radio signal to be transmitted to each mobile station becomes small. Therefore, the data rate to be allowed to each mobile station becomes low. If the number of mobile stations accommodated in a base station is small, the amount of transmitting power allocable to a radio signal to be transmitted to each mobile station becomes large. Therefore, the data rate to be allowed to each mobile station becomes high.

FIG. 3 shows a table used to manage the transmitting power of each radio signal. This table stores information representing the data rate of each of the signals transmitted using corresponding radio transmission path (or radio channel) between a base station and each mobile station, and information representing a transmitting power corresponding to the data rate. This table is used to determine the data rate of each radio channel in such a way that the sum of the transmitting powers of individual radio signals does not exceed the maximum transmitting power of a base station.

All signals transmitted from a base station are collectively amplified and are transmitted into the air. In this case, since a transmitting power is needed in proportion to a transmitting rate in CDMA, high-speed data cannot be transmitted if a power of a specific value or more is not allocated. However, since in a base station, the maximum total transmitting power is restricted by hardware, the total limited power must be efficiently divided among a plurality of channels.

A "modulator" represents a modulator which is used to modulate signals to be transmitted from a base station to a mobile station, and is managed by the modulator management table shown in FIG. 4. The number of modulators which can be provided in each base station is predetermined. This table stores information representing the usage (in use/available) of each modulator and if the relevant modulator is in use, it also stores information identifying the radio channel using the modulator.

A modulator is needed for each communications channel. A plurality of modulators are sometimes needed in proportion to the speed depending on the type of a modulator. When a plurality of modulators are needed in a case where many modulators are provided in an array, there is sometimes a restriction that only consecutively arrayed modulators can be used. In particular, if low-rate signals, such as voice and the like, are allocated here and therein the modulator array, a plurality of idle modulators cannot be consecutively secured. Therefore, high-speed data cannot be allocated. In this case, since the number of modulators is physically limited, the efficient management of modulators is needed.

A "spreading code" is used to spread signals transmitted between a base station and a mobile station, and is managed by the spreading code management table shown in FIG. 5. The number of available spreading codes of each base station is predetermined. This table stores information representing the usage (in use/available) of each spreading code and if the relevant spreading code is in use, it also stores information identifying the radio channel using the spreading code. For the spreading code, a Walsh code is used.

In a CDMA system, a Walsh function and the like are used for the spreading codes, and channels are identified by enabling Walsh codes to be orthogonal to one another for each channel. The number of spreading codes is limited, and when allocating a spreading code to each channel, a remaining available code is allocated. The degree of a spreading code, which is required depending on the data rate, is variable. The higher the data rate becomes, the smaller the degree of the spreading code becomes. If a plurality of spreading codes are used here and there in a scattered manner, spreading codes cannot be allocated to high-data rate communications. Therefore, the efficient allocation of a spreading code is also needed.

A "demodulator" represents a demodulator which is used to demodulate signals transmitted from a mobile station to a base station, and is managed by the demodulator management table shown in FIG. 6. The number of demodulators provided in each base station is basically the same as the number of modulators. This table stores information represents the usage (in use/available) of each demodulator and also information identifying the radio channel using the demodulator if the relevant spreading code is in use.

A "decoder" represents a decoder which is used to decode signals transmitted from a mobile station to a base station, and is managed by the decoder management table shown in FIG. 7. The number of decoders provided in each base station is predetermined. This table stores information represents the usage (in use/available) of each decoder and if the relevant decoder is in use, it also stores information identifying the radio channel using the decoder. For the decoder, for example, a Viterbi decoder or a turbo-decoder is used.

A "frame-offset" is information used to designate a timing in which a signal should be inserted in a frame transmitted/received between a base station and a base station control device. Specifically, for example, frame-offset designates a prescribed time slot in a TDM frame with a plurality of time slots. More specifically, frame-offset is, for example, an offset in units of 1.25 ms obtained by dividing a 20 ms frame transmitted/received between the base station and base station control device into 16 pieces. The frame-offset is managed by the frame-offset management table shown in FIG. 8A. In other words, a 2 Mbps line connects the base station and the base station control device and this line is managed in the unit of 20 ms frame, which is the basic frame size of a CDMA system. This 20 ms frame is divided into 16 pieces, and each channel allocation is managed in units of 1.25 ms. In this case, if channels are focused on a specific frame-offset, there is a possibility that all of the channels may not be accommodated. Therefore, when allocating a frame-offset to a new channel, the frame-offset must be allocated so as to be properly distributed, depending on a channel allocation situation for each frame offset.

A "channel ID" is information used to identify a channel established in a transmission line between a base station and a base station control device. Specifically, a channel ID is attached to identify transmitted/received data. In other words, a number is attached to each of a plurality of pieces of data transmitted/received in one call and the data are managed inside the device and so on. Generally, the attached number and the piece of data are processed in pairs inside the device and, the length of the attached number is also limited.

A "band" is information represents a band allocated to each channel established in a transmission line between a base station and a base station control device, and is managed by the band management table shown in FIG. 8B. Specifically, the band is allocated to each channel that is established in a frame in units of 1.25 ms transmitted/received between a base station and a base station control device. In this case, for example, a plurality of channels are allocated to one frame-offset. Therefore, the band of each channel must be managed in such a way that the frame can accommodate all the channels.

Since the throughput of an inter-device interface between a base station and a base station control device is limited, the limited throughput must be efficiently divided and used among subscribers. For example, if an ATM line is used for the inter-device interface, the entire resources of an ATM cell transferred between devices are divided with reference to the transmitting timing of data (frame-offset) and transmission band. In this case, the frame-offset and the band are managed together.

Next, the sequence of the hand-off of the present invention is described. Both a case where a mobile station initiates the hand-off and a case where a base station initiates the hand-off are described below.

Figure 9:
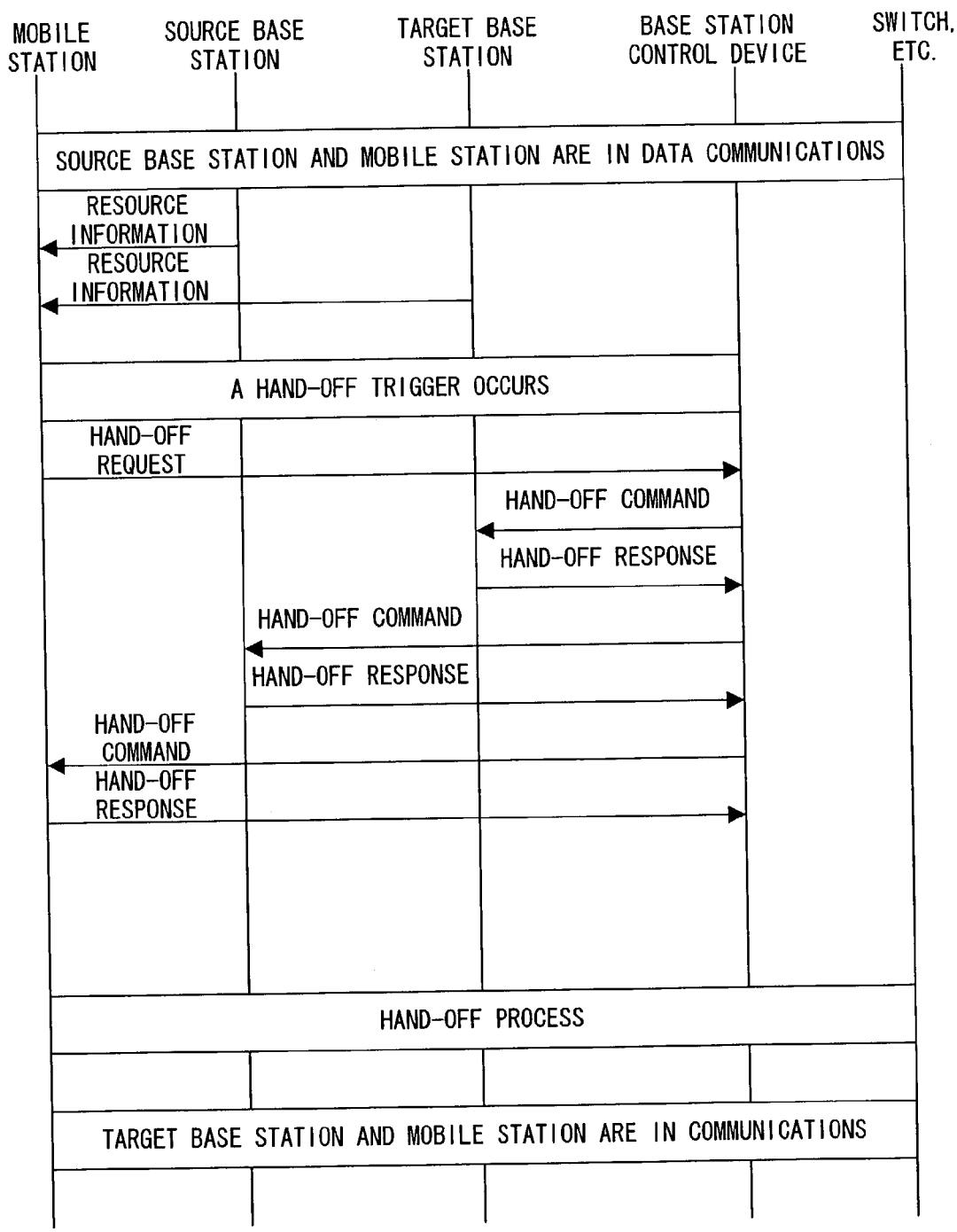
FIG. 9 is a sequence chart showing a process for a mobile station judging whether to perform hand-off.

FIG. 9 is a sequence chart in the case where a mobile station judges whether to perform hand-off. In this description, a base station accommodating the mobile station is called a "source base station". In other words, it is assumed that the mobile station is currently conducting data communications through the source base station. A base station having the possibility of accommodating the mobile station is called a "target base station".

Each base station broadcasts resource information regularly or when there is a prescribed trigger. Here, a "prescribed trigger" means when a condition of the communication resources managed by a base station changes. For example, when a call is terminated, when a new call is established, when the data rate of arbitrary communications changes and the like are all considered "prescribed triggers". It is assumed that resource information broadcast by each base station is informed to all mobile stations located within the communications area of the relevant base station.

In this case, resource information informed from a base station to a mobile station is information about the resources shown in FIG. 2. Specifically, such information is generated by referring to the tables shown in FIGS. 3 through 8. For example, the difference between the maximum transmitting power of a base station and the current transmitting power (available power), a data rate corresponding to the difference (allowable data rate) or the number of unit channels that can be converted into the above two pieces of data are informed as information about the "transmitting power". As for information about a "modulator", a "spreading code", a "demodulator", a "decoder" and a "channel ID", information indicating whether there is an available modulator, information indicating whether there is an available spreading code, information indicating whether there is an available demodulator, information indicating whether there is an available decoder and information indicating whether there is an available channel ID are inform, respectively. Furthermore, as for information about a "band", for example, information indicating that there is an available band is informed.

There is no need for resource information informed from a base station to a mobile station to include all the pieces of information described above. However, it is preferable for this resource information to include at least information about transmission power.

Upon receipt of resource information from both the source base station and the target base station, the mobile station judges whether to request a hand-off, based on the two pieces of resource information. If it decides to request a hand-off, the mobile station issues a hand-off request to a base station control device through the source base station. This judgment method will be described later.

Upon receipt of the hand-off request from the mobile station, the base station control device issues a hand-off command to the source base station, the target base station and the mobile station. In this case, a hand-off command including a command to disconnect a radio connection to the mobile station is issued to the source base station. In addition, a hand-off command including a command to accommodate the mobile station is issued to the target base station. Furthermore, a hand-off command including a command to establish a radio connection between the mobile station and target base station, and a command to disconnect the radio transmission path between the mobile station and source base station is issued to the mobile station. Then, each of the source base station, the target base station and the mobile station returns a hand-off response corresponding to the hand-off command.

Then, each of the source base station, the target base station and the mobile station performs a hand-off process according to the hand-off command. Specifically, for example, negotiations for channel allocation and the like are conducted between the mobile station and target base station, and a radio transmission path is established. Then, the radio transmission path between the mobile station and source base station is released. After that, the mobile station is accommodated in the target base station and is connected to a network through the target base station.

Although in the example described above, each base station individually broadcasts resource information to the mobile station, resource information can also be informed to the mobile station by another method. For example, a base station may inform resource information to the mobile station upon request from the mobile station.

Figure 10:
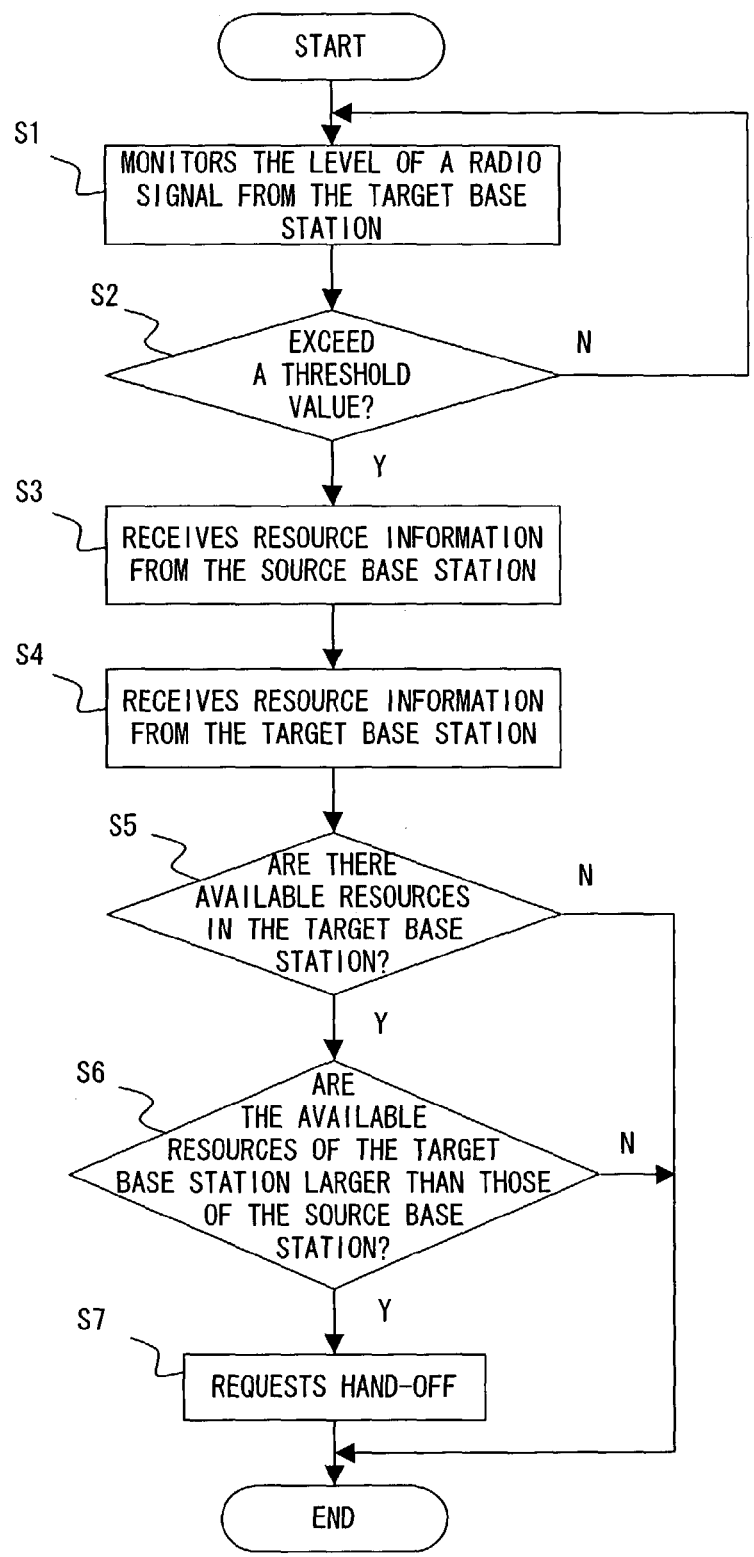
FIG. 10 is a flowchart showing a process for judging whether to request hand-off.

FIG. 10 is a flowchart showing a process for judging whether to request hand-off. A mobile station performs this process. It is assumed that this mobile station is accommodated in the source base station.

In step S1, the mobile station monitors the power of a radio signal from a target base station. In step S2, the mobile station checks whether the power of the signal detected in step S1 exceeds a predetermined threshold value. If the power of the signal exceeds the threshold value, the mobile station performs processes in and after steps S3. Otherwise, the flow returns to step S1.

In step S3, the mobile station receives resource information from the source base station. In step S4, the mobile station receives resource information from the target base station.

In step 5, the mobile station checks whether there are available communication resources in the target base station. Specifically, the mobile station checks whether a radio channel can be established between the mobile station and the target base station. More specifically, for example, the mobile station refers to the resource information informed from the target base station and checks whether there is an available modulator, an available spreading code, an available demodulator, an available decoder and the like in the target base station. If there are necessary available communication resources left in the target base station, the flow proceeds to step S6. Otherwise, the process is terminated.

In step S6, the mobile station compares the resource information received from the source base station with that received from the target base station. Specifically, the mobile station checks in which base station there are more available resources, in the source base station or target base station. For communication resources to be compared, for example, transmitting power is used. In this case, for information about transmitting power, the available power or allowable data rate of each base station is used, as described above. Therefore, in this case, in step S6, the respective available powers or allowable data rates of the two base stations are compared, as described above.

If the available resources of the target base station is larger than that of the source base station, in step S7, the mobile station generates the hand-off request and transmits the request to the base station control device. This hand-off request includes, for example, information identifying each of the source base station and the target base station. If the available resources of the target base station is smaller than that of the source base station, the process is terminated without generating a hand-off request.

In this way, in the mobile communication system of this, embodiment, if a mobile station can transmit/receive a radio signal to/from a plurality of base stations (in this case, a source base station and a target base station), hand-off is performed in such a way that the mobile station can be connected to a network through the base station with the most available resources. After being accommodated in the base station with the most available resources, the mobile station can conduct high-speed communications using as many communication resources as possible.

Although in this embodiment, available resources are compared, the present invention is not limited to this method. That is to say, for example, a plurality of pieces of resource information received from a plurality of base stations may be compared, and a base station that can secure the most communication resources can also be selected.

Figure 11:
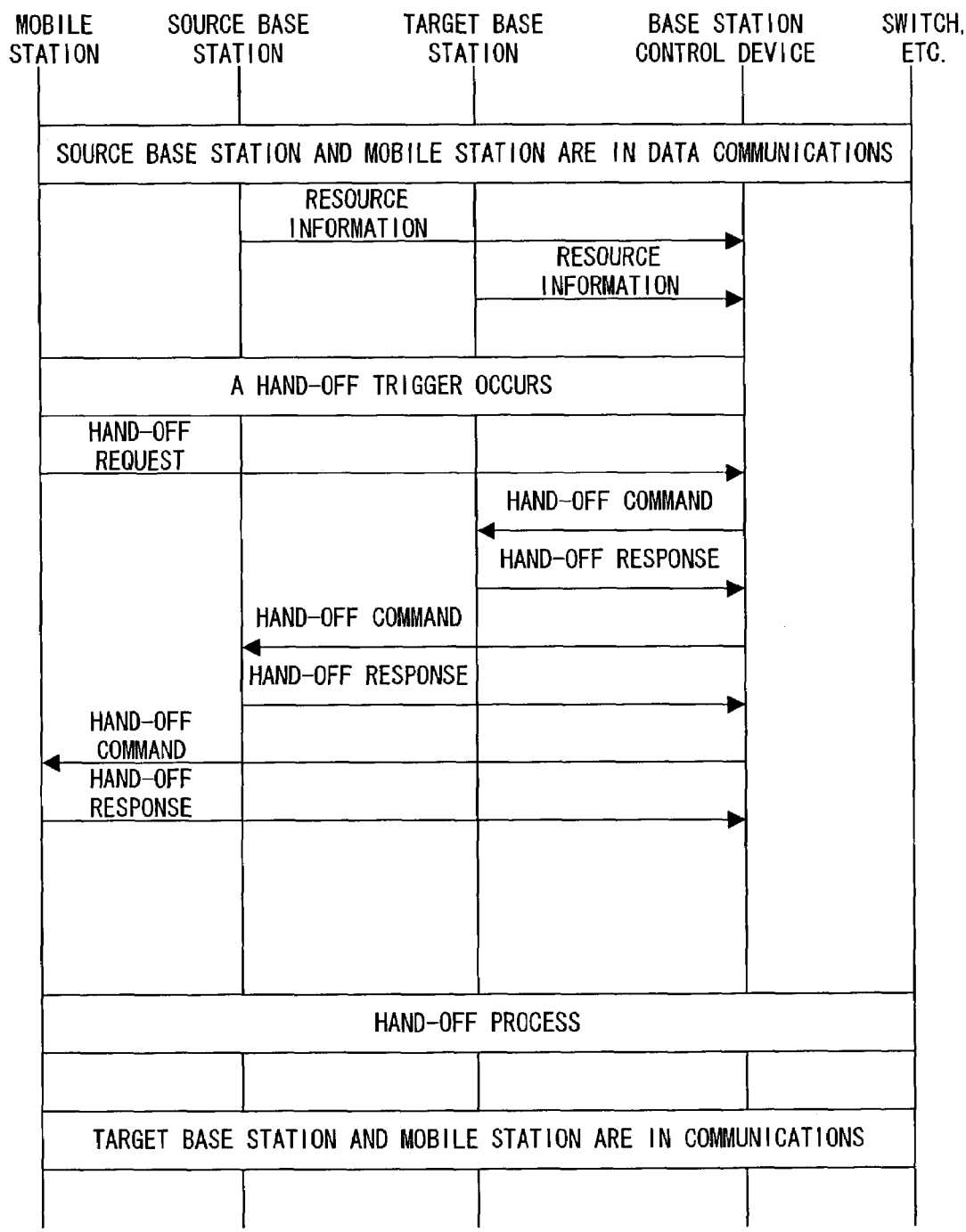
FIG. 11 is a sequence chart showing a process for a base station control device judging whether to perform hand-off.

FIG. 11 is a sequence chart showing a process where a base station control device judges whether to perform a hand-off. It is assumed that the mobile station is currently conducting data communications through a source base station, as in the example shown in FIG. 9.

Each base station notifies a base station control device of resource information periodically or when there is a prescribed trigger. Here, the prescribed trigger and resource information to be informed are the same as those in the example described with reference to FIG. 9.

Upon receipt of resource information from both the source base station and the target base station, the base station control device judges whether to perform a hand-off, based on the tow sets of resource information. This judgment process is basically the same as the process of the mobile station shown in FIG. 10. However, in the base station control device, steps S1, S2 and S7 are not executed.

If it is judged that a hand-off should be performed, the base station control device issues a hand-off command to each of the source base station, the target base station and the mobile station. These hand-off commands are basically the same as those described with reference to FIG. 9. Then, each of the source base station, the target station and the mobile station returns a hand-off response corresponding to the respective hand-off command to the base station control device.

Then, each of the source base station, the target station and the mobile station performs a hand-off process according to the respective hand-off command described above, as in the sequence described with reference to FIG. 9. In this way, after this hand-off process, the mobile station is accommodated in the target base station and is connected to a network through the target base station. However, even if the hand-off command is issued, a hand-off process is not performed when the power of a radio signal received from the target base station by the mobile station is lower than a threshold value or when the quality of the radio transmission path between the mobile station and target base station is lower than a prescribed level.

In this sequence, resource information can be managed by the switch station or can be reciprocally informed between all the base stations.

Figure 12:
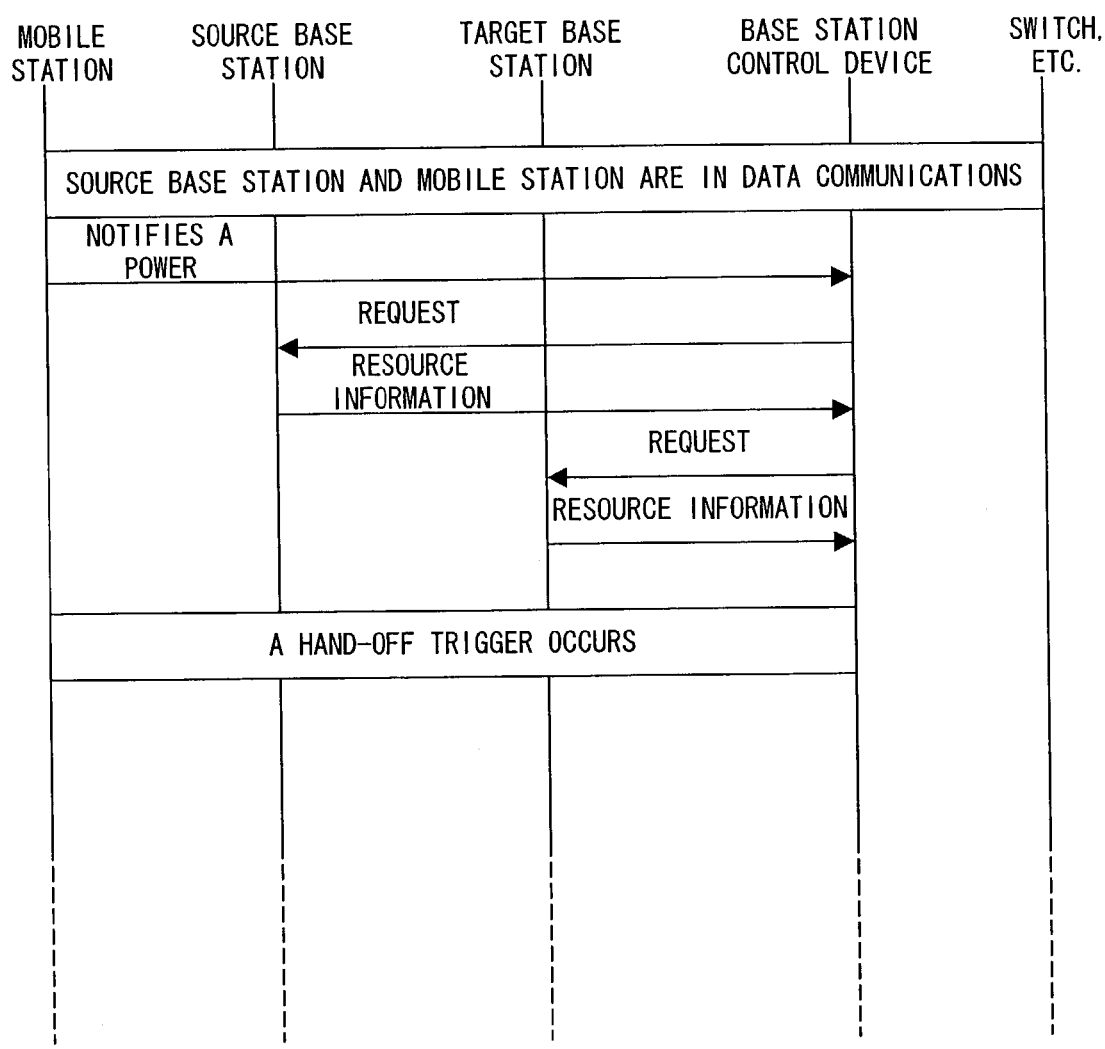
FIG. 12 is another sequence chart showing a process for a base station control device judging whether to perform hand-off.

FIG. 12 is another sequence chart showing a process for the base station control device judging whether to perform a hand-off. In this sequence, when detecting that the power of a radio signal from the target base station exceeds a threshold value, the mobile station notifies a base station control device of the fact. Upon receipt of this notice, the base station control device makes a request for resource information to each of the source base station and the target base station. On the other hand, each of the source and target base stations notifies the base station control device of resource information, as requested. Then, the base station control device judges whether to perform hand-off, according to the two pieces of resource information. Since the procedure after that is the same as that of the sequence shown in FIG. 9 or 11, the description is omitted.

In this way, in the mobile communication system of the first embodiment, if a mobile station can transmit/receive signals to/from a plurality of base stations, hand-off is performed in such a way that the mobile station can be connected to a network through a base station with the most available communication resources of all the base stations. Therefore, the mobile station can always be accommodated in an optimal base station and can conduct high-speed communications.

Second Embodiment

As described about the first embodiment, the maximum total transmitting power of a base station is predetermined and the data rate of a signal transmitted through a radio transmission path is also restricted accordingly. Therefore, for example, if high-speed packet data communications are attempted, the amount of communication resources that can be allocated to other communications become small, which affects other communications. In packet data communications, the data rate changes greatly. Therefore, if a large amount of communication resources is fixedly allocated to packet data communications, there are communication resources reserved without being used when the data rate of the packet data communications drops.

This problem can be solved if the amount of communication resources to be allocated to each connection and/or the data rate of each connection is dynamically adjusted, as requested.

In the mobile communication system according to the second embodiment, the allocation of communication resources or data rate is adjusted using one of the following items as a trigger.
(1) Origination of a new call
(2) Release of a call
(3) Delay in a reverse link (upstream link)
(4) Delay in a forward link (downstream link)
(5) Inquiry The "origination of a new call" is detected by a base station accommodating a mobile station that is about to start communications. When a new call is established, communication resources must be allocated to the new call. In this case, if there are available communication resources, the communication resources are allocated to the new call. However, if there are no available communication resources, a part of communication resources already allocated to a specific connection must be re-allocated to the new call. Therefore, in this case, the data rate of the specific connection will be reduced.

The "release of a call" is detected by a base station accommodating the mobile station when communications are terminated. If a call is released, communication resources which have been allocated to the released call can be re-allocated to another call. In this case, the data rate of a specific connection can be improved by allocating the released communication resources to the specific connection.

A "delay in a reverse link" occurs when a sufficient data rate is not assigned to a connection for transmitting data from a mobile station to a base station. Specifically, the delay in a reverse line is detected when the data from a mobile station are not transmitted to a base station within a predetermined time period. The mobile station comprises a data queue (for example, a FIFO memory) for temporarily storing data to be transmitted to abase station, and it is judged whether there is delay based on whether there are data left in the data queue. If there is the delay, the fact is informed to the base station control device and the data rate of a corresponding connection is improved using this notice as a trigger.

A "delay in a forwarding link" occurs when a sufficient data rate is not assigned to a connection for transmitting data from a base station or base station control device to the mobile station. The base station or the base station control device comprises a buffer memory for temporarily storing data to be transmitted to the mobile station for each connection, and it is detected that there is the delay when the amount of data stored in the buffer memory exceeds a threshold value. If there is the delay in a specific connection, the data rate of the specific connection will be improved.

An "inquiry" is a procedure where a base station control device makes an inquiry about resource information by polling to base stations. If available communication resources are found in this inquiry, the data rate of a specific connection will be improved by allocating the available communication resources to the specific connection.

A method for adjusting a data rate when the triggers (1) through (5) described above occurs is described with reference to FIGS. 13 through 16 below.

Figure 13:
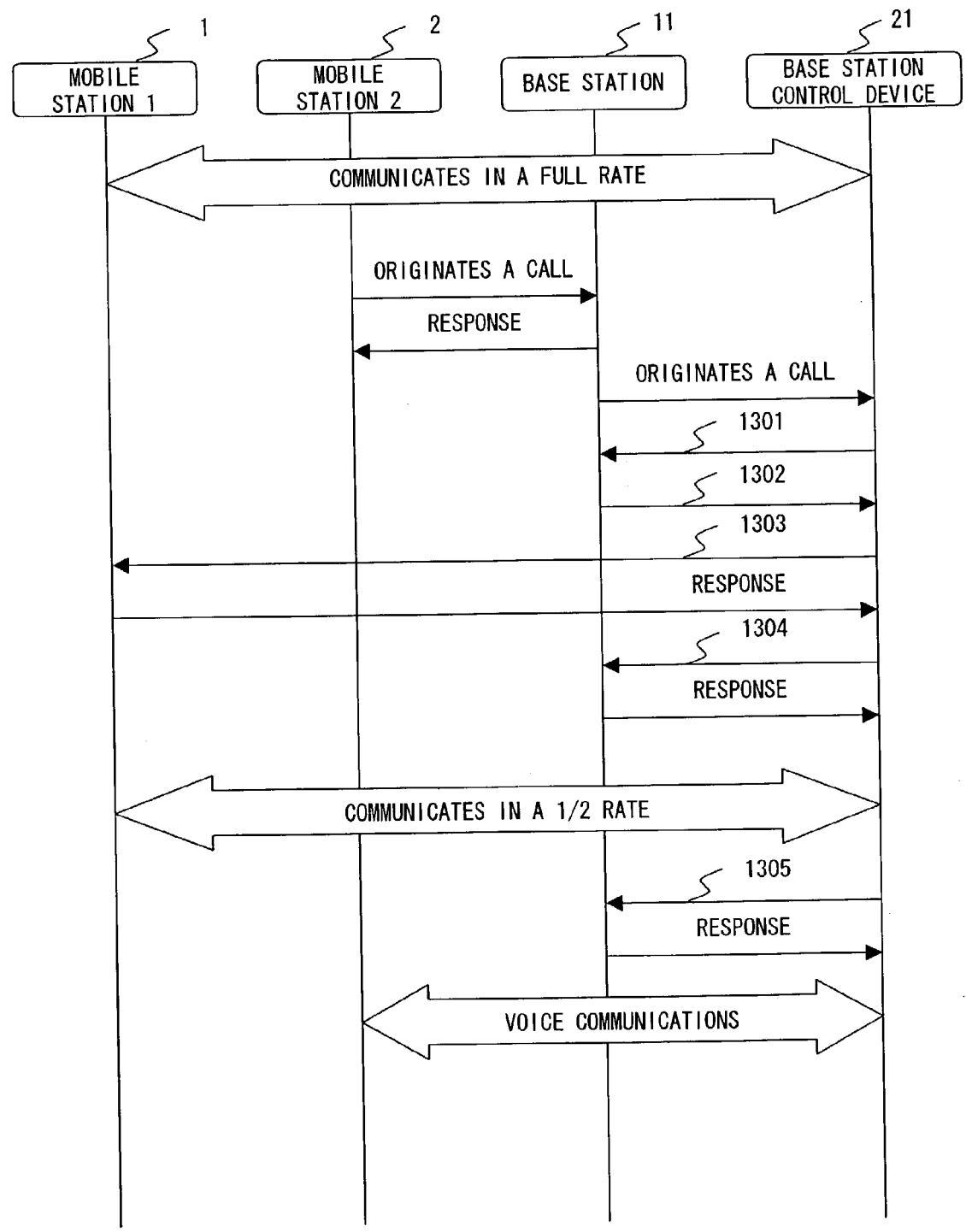
FIG. 13 is a sequence chart showing a process for adjusting data rate when a new call is established.

FIG. 13 is a sequence chart showing a process for adjusting a data rate when a new call is established. In this example, it is assumed that the mobile station 1 is currently conducting packet data communications at a full rate (the maximum transfer rate) through a base station 11. It is also assumed that the mobile station 2 located within the communication area of the base station 11 has originated a call to start new communications in this state.

When detecting the new call, the base station 11 returns a response message to the mobile station 2 and notifies a base station control device of the origination of a call. When detecting the origination of a call, the base station control device 21 issues a resource allocation request (1301) to the base station 11. This resource allocation request (1301) is an inquiry message on whether there are available communication resources to be allocated to the new call left.

Upon receipt of the resource allocation request (1301), the base station 11 checks whether there are any available communication resources to be allocated to the mobile station 2, by referring to the tables shown in FIGS. 3 through 8 and the like. In this example, it is assumed that there are no such available communication resources. In this case, the base station 11 returns a resource-full response (1302) to the base station control device 21. The resource-full response (1302) is a message indicating that there are no available communication resources. If there are available communication resources, the communication resources are allocated to the mobile station 2. In this case, the communications of the mobile station 1 are not affected.

Upon receipt of the resource-full response (1302), the base station control device 21 issues an adjustment instruction (1303) to the mobile station 1. This adjustment instruction (1303) is a notification indicating that the data rate should be adjusted from a "full rate" to a "½ rate". The base station control device also issues a rate adjustment request (1304) to the base station 11. This rate adjustment request (1304) is an instruction to adjust the data rate of the mobile station 1 from a "full rate" to a "½ rate". Although in the example shown in FIG. 13, the rate adjustment request (1304) is issued after the adjustment instruction (1303) is issued, the rate adjustment request (1304) can be issued before the adjustment instruction (1303) is issued.

Each of the mobile station 1 and the base station 11 adjusts a data rate in a specific timing upon request from the base station control device 21. After that, the mobile station 1 is connected to a network with a "½ rate". In this case, the base station 11 enables a part of the communication resources which have been allocated to the mobile station 1 to be used for other communications. Specifically, transmitting power which has been assigned to the mobile station 1 is reduced by reducing the data rate of the mobile station 1, and the saved transmitting power can be used for other communications.

Then, the base station control device 21 issues a resource allocation request (1305) to the base station 11. This resource allocation request (1305) includes an instruction to allocate available communication resources to the mobile station 2. Then, the base station 11 returns a response to the base station control device 21 and properly allocates communication resources to the mobile station 2. In this way, the mobile station 2 starts communications at a prescribed data rate.

Although in the example shown in FIG. 13, saved communication resources are allocated to the mobile station 2 by reducing the data rate of the mobile station 1, communication resources can also be re-allocated by the following methods. Specifically, some communication resources which have been allocated to the mobile station with the highest data rate of a plurality of mobile stations accommodated in the base station 11 can be re-allocated to a new call. Alternatively, if packet data communications and voice communications coexist, some communication resources allocated to an arbitrary or all packet data communications can be re-allocated to a new call.

Figure 14:
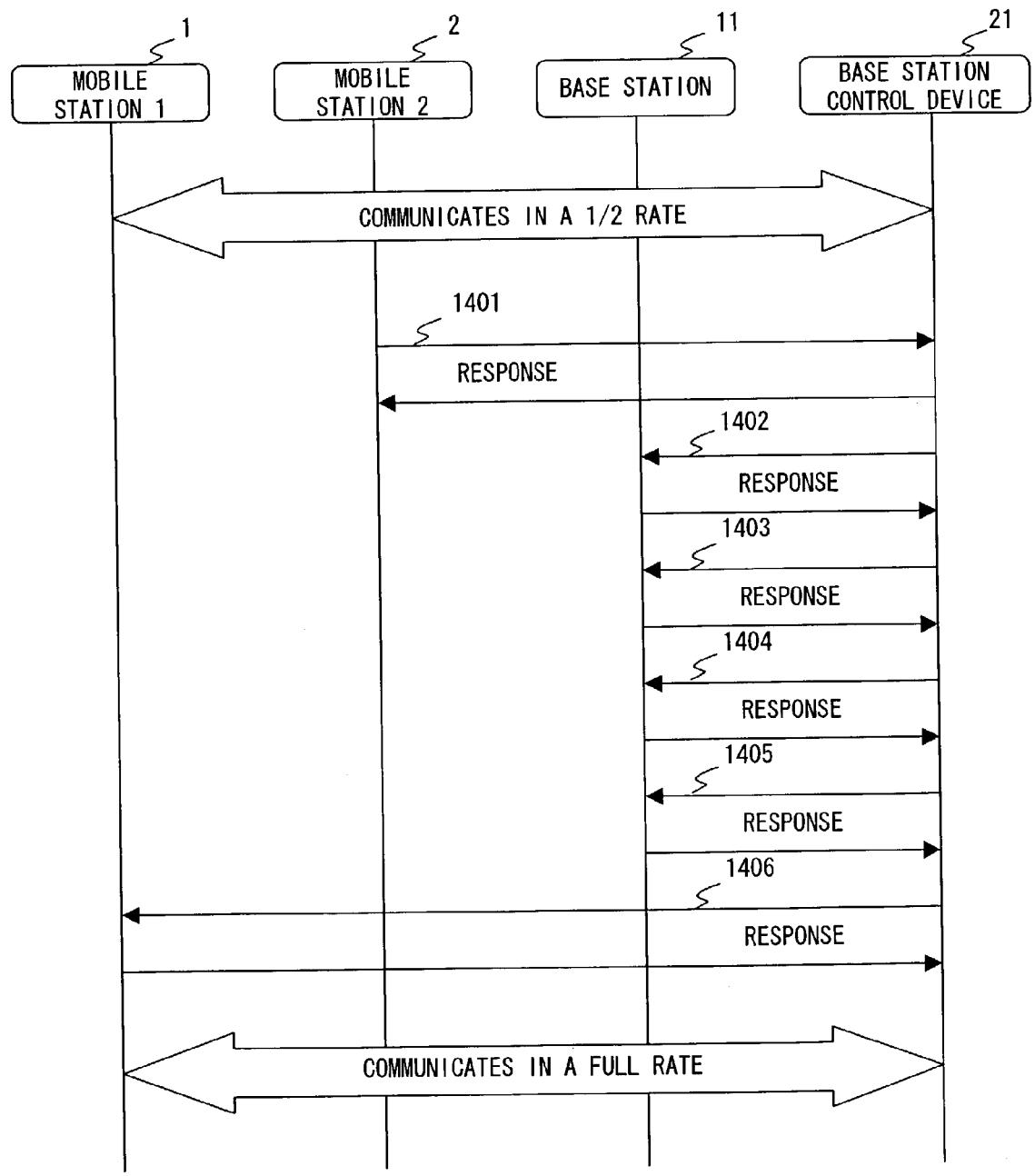
FIG. 14 is a sequence chart showing a process for adjusting data rate when a call is released.

FIG. 14 is a sequence chart showing a process for adjusting the data rate when a call is released. In this example, it is assumed that mobile stations 1 and 2 are connected to a network through a base station 11. It is also assumed that the mobile station 1 is conducting packet data communications at a ½ rate. It is further assumed that the mobile station 2 has terminated communications.

The mobile station 2 issues a call release request (1401) to the base station control device 21. Upon receipt of this request, the base station control device 21 returns a response message to the mobile station 2 and issues a call release request (1402) to the base station 11. The base station 11 disconnects the connection to the mobile station 1 in response to this request and then returns a response message to the base station control device 21.

Then, the base station control device 21 issues a resource release request (1403) to the base station 11. This resource release request (1403) includes an instruction to release communication resources which have been allocated to the mobile station 2 and to use the released resources for other communications. Upon receipt of this resource release request (1403), the base station 11 releases the communication resources which have been allocated to the mobile station 2.

Then, the base station control device 21 issues a resource allocation request (1404) to the base station 11. This resource allocation request (1404) includes an inquiry message on whether there are available communication resources sufficient to improve the data rate of the mobile station 1. Then, the base station 11 refers to the tables shown in FIGS. 3 through 8 and the like in response to this resource allocation request (1404) and notifies the base station control device 21 of the state of available communication resources.

If there are available communication resources sufficient to improve the data rate of the mobile station 1, the base station control device 21 issues a rate adjustment request (1405) to the base station 11. This rate adjustment request (1405) is an instruction to adjust the data rate of the mobile station 1 from a "½ rate" to a "full rate". If there are no available communication resources sufficient to improve the data rate of the mobile station 1, the base station control device 21 terminates the process without issuing the rate adjustment request (1405).

Furthermore, the base station control device 21 issues an adjustment instruction (1406) to the mobile station 1. This adjustment instruction (1406) is a notice indicating that a data rate should be adjusted from the "½ rate" to the "full rate". As a result, the mobile station 1 is connected to a network at the "full rate" through the base station 11.

FIG. 15 is a sequence chart showing a process for adjusting a data rate when there is delay in an upstream transmission line. In this example, it is assumed that a mobile station 1 is connected to a network at a ½ rate through the base station 11.

The base station control device 21 makes an inquiry about whether there is delay, to the mobile station 1. The mobile station 1 comprises a data queue for temporarily storing data to be transmitted to the base station 11, it judges whether there is delay based on whether there are data in the data queue left. Alternatively, whether there is delay is judged based on whether all pieces of data stored in the data queue are transmitted to the base station 11 within a prescribed time period when the mobile station 1 receives the inquiry from the base station control device 21. Then, the mobile station 1 notifies the base station control device 21 of the judgment result using an inquiry response (1501).

The sequence after the fact that there is delay in the mobile station 1 is informed to the base station control device 21 is the same as that described with reference to FIG. 14. Specifically, the base station control device 21 issues a resource allocation request (1502) and a rate adjustment request (1503) to the base station 11. Then, the base station 11 allocates available communication resources to the mobile station 1. In addition, the base station control device 21 also issues an adjustment request (1504) to the mobile station 1. In this way, the mobile station 1 is connected to a network at the "full rate" through the base station 11.

Although in the example shown in FIG. 15, the mobile station 1 notifies the base station control device 21 of the occurrence/non-occurrence of delay upon inquiry from the base station control device 21, the occurrence/non-occurrence of delay can also be spontaneously informed to the base station control device 21 when a delay occurs. In this case, the mobile station 1 issues a resource allocation request to the base station control device 21 instead of the inquiry response (1501).

Figure 16:
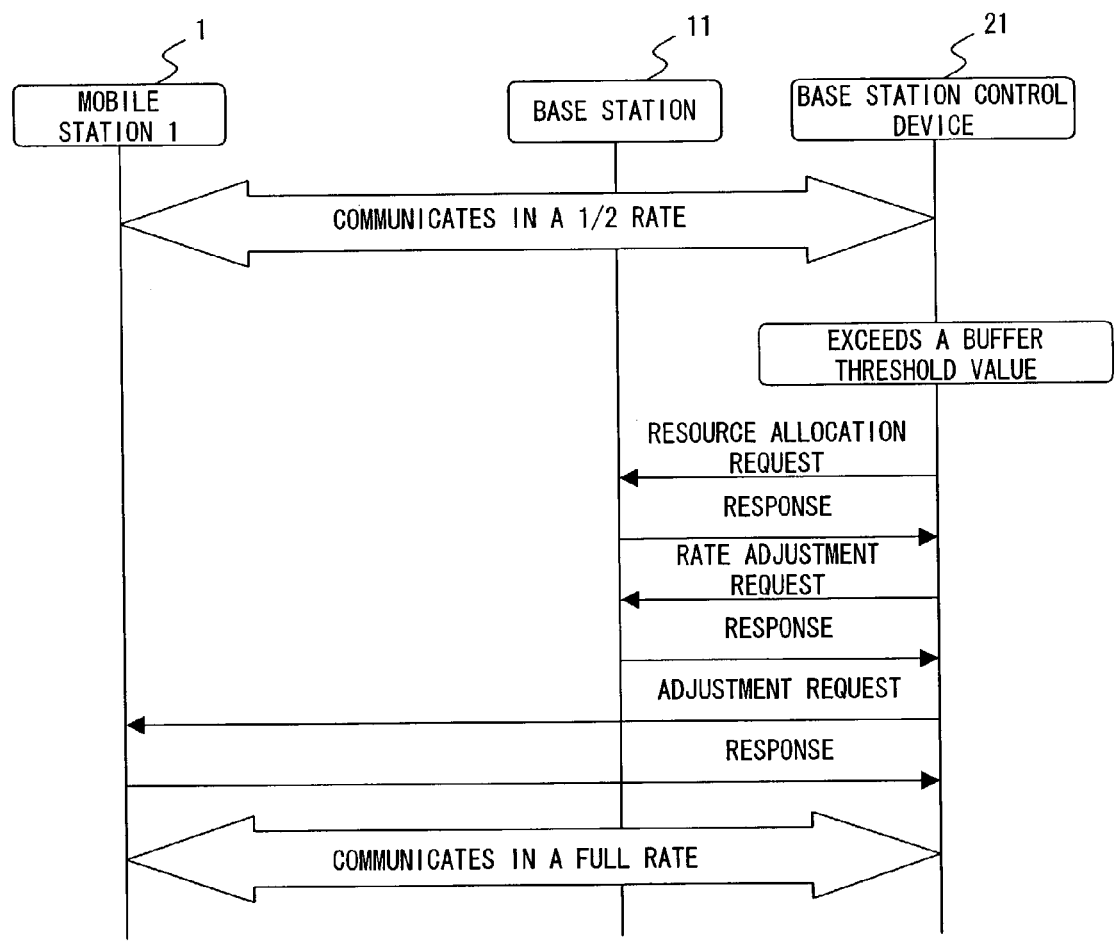
FIG. 16 is a sequence chart showing a process for adjusting data rate when there is delay in a downstream transmission line.
Figure 18:
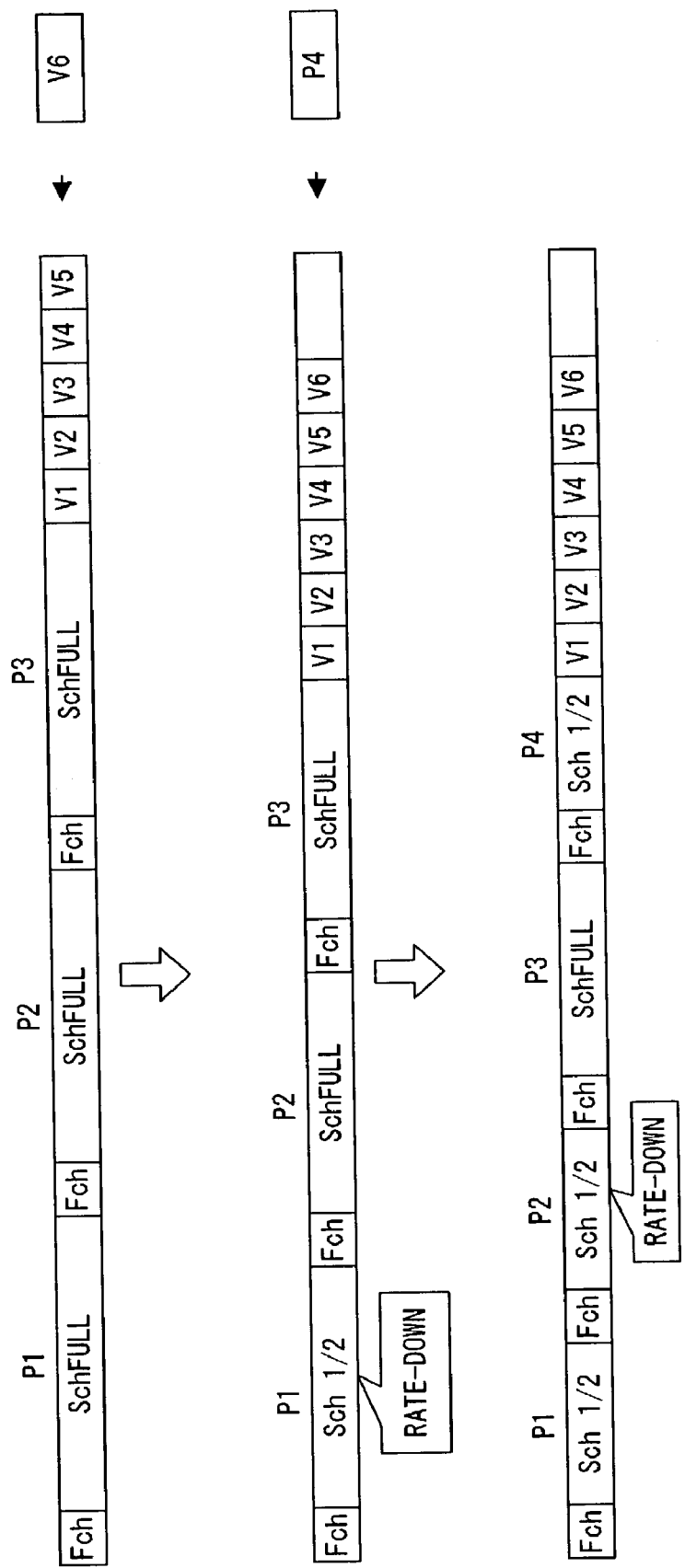

FIG. 16 is a sequence chart showing a process for adjusting a data rate when there is delay in a downstream transmission line. In this example, it is assumed that a mobile station 1 is connected to a network at a ½ rate through a base station 11.

The base station control device 21 comprises a buffer memory for temporarily storing data to be transmitted to the mobile station 1. If the amount of data stored in the buffer memory exceeds a threshold value, the base station control device 21 judges that there is delay in a connection to the mobile station 1.

The process after the delay is detected is the same as that described with reference to FIG. 14. Specifically, the base station control device 21 issues the resource allocation request and the rate adjustment request to a base station 11. Then, the base station 11 allocates available communication resources to the mobile station 1. The base station control device 21 issues the adjustment instruction to the mobile station 1. In this way, the mobile station 1 is connected to a network at full rate through the base station 11.

Although in the example shown in FIG. 16, a buffer memory is provided in the base station control device 21, it can also be provided in the base station 11. In this case, for example, the base station control device 21 makes an inquiry about an amount of data stored in the buffer memory to the base station 11 and judges whether to adjust the data rate of the mobile station 1, based on the result.

FIGS. 17 through 20 show specific examples of a rate adjustment procedure in the mobile communication system of the second embodiment. In this example, it is assumed that packet data communications and voice communications coexist. In FIGS. 17 through 20, P1–P6 and V1–V37 represent packet data communications and voice communications, respectively. A base station (and a base station control device) properly allocates limited communication resources among packet data communications and voice communications. In this example, a power (the transmitting power of a radio signal transmitted by a base station), a device (modem device for a signal transmitted/received to/from a mobile station in a base station), a code (spreading code for spreading signals transmitted/received between a mobile station and a base station) and a line (time slot in TDM communications between a base station and a base station control device) are taken as communication resources.

A fundamental channel (F channel) or supplementary channel (S channel) is allocated to each connection. In this case, the amount of resources allocated to a fundamental channel is the same as that of a voice channel. In packet data communications, a fundamental channel is allocated to a connection for the packet data communications, and when the amount of data being transmitted increases, a supplementary channel can be allocated. In this case, the amount of resources of the supplementary channel is variable as in the sequence shown above.

If there are available communication resources left when a new connection is established, the available communication resources are allocated to the new connection. In this case, the maximum possible communication resources can be allocated to packet data communications. In the example shown in FIG. 17, the full rate of a supplementary channel is allocated to each of packet data communication connections P1, p2 and p3.

If there are no available communication resources left when a new connection is established, some communication resources which have been allocated to a specific connection will be allocated to the new connection by reducing the data rate of the specific connection according to the sequence shown in FIG. 13. In the example shown in FIG. 18, the data rate of a packet data communication connection P1 is reduced from a "full rate" to a "½ rate" in order to establish a voice communication connection V6. Here, communication resources obtained by reducing the data rate of packet data communication connection P1 are allocated to the voice communication connection V6. Similarly, the data rate of a packet data communication connection P2 is reduced from the "full rate" to the "½ rate" in order to establish a packet data communication connection P4. Here, communication resources obtained by reducing the data rate of the packet data communication connection P2 are allocated to the packet data communication connection P4.

Figure 19:
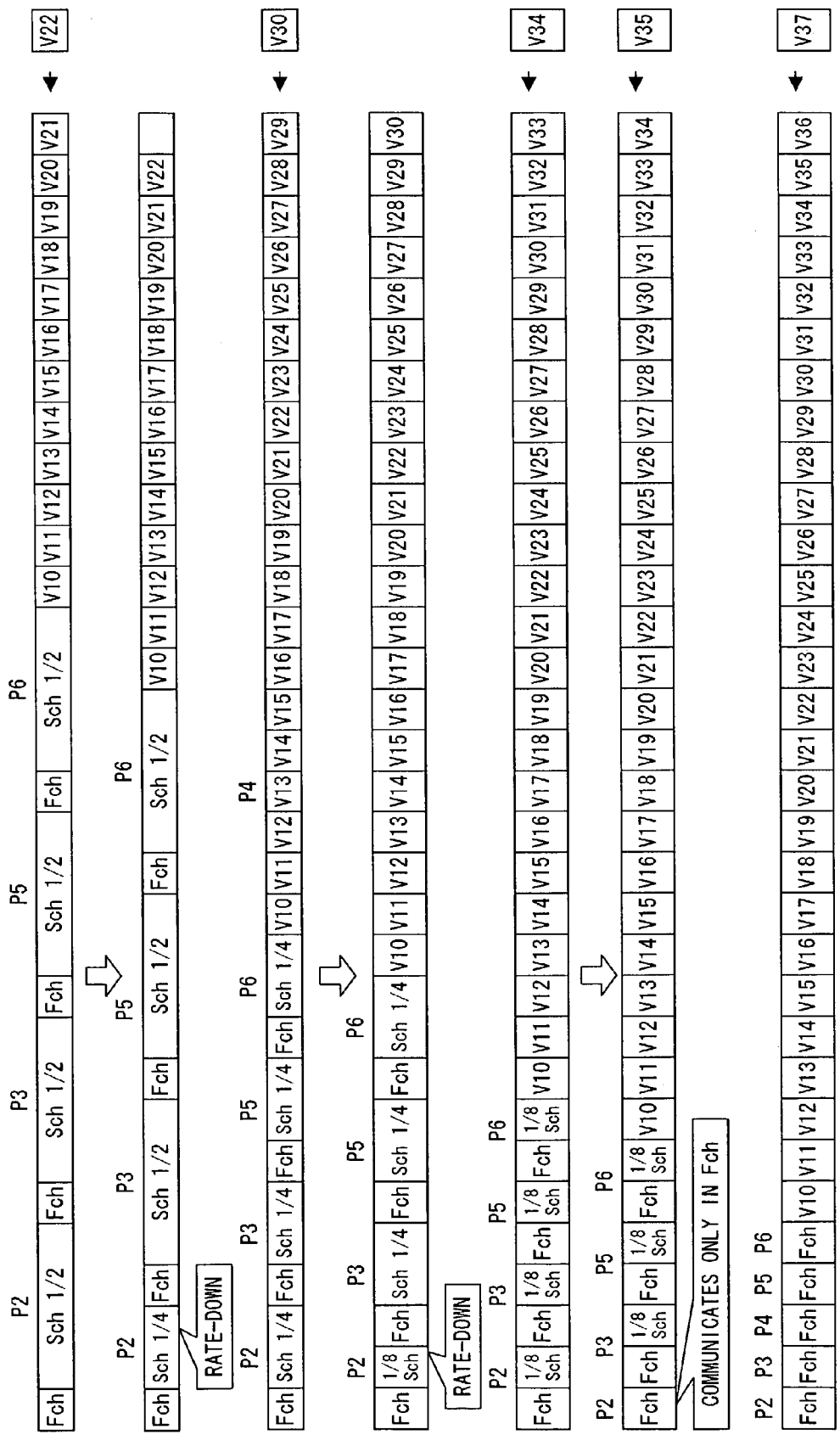
Figure 20:
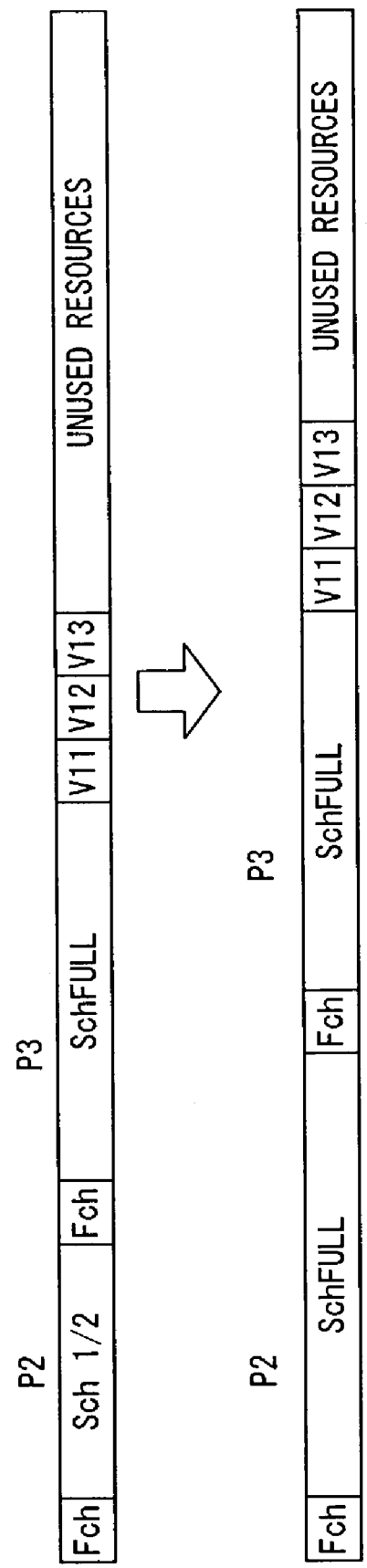

Then, if a new connection is further established, as shown in FIG. 19, the data rates of packet data communication connections are sequentially reduced. In this case, if a new packet data communication connection is established, the data rate of a connection with the highest data rate is reduced and the same data rate as the lowest data rate of all the data rates of existing packet data communication connections is assigned to the new connection. If a new connection is further established after the data rates of all packet data communication connections are reduced to the lowest speed, the connection is refused. In other words, call loss occurs.

On the other hand, as described with reference to FIGS. 15 and 16, if there is delay in a specific connection, it is checked whether there are available communication resources to be additionally allocated to the connection. If there are available communication resources, the communication resources are allocated to the connection, and the data rate of the connection is improved. In the example shown in FIG. 20, communication resources are additionally allocated to packet data communication connection P2, and the data rate of the connection is improved from a "½ rate" to a "full rate".

If the release of a call generates available communication resources, the released communication resources are allocated, for example, to packet data communications with the lowest data rate. In this way, the data rate of the connection is improved.

In this way, in the mobile communication system of the second embodiment, when a trigger, such as the origination of a call, the release of a call, delay in communications and the like, occurs, communication resources are properly allocated among connections. In this way, communication resources can be efficiently used. The adjustment of a data rate, in other words, the re-allocation of communication resources can be performed independently in each of upstream and downstream links.

Third Embodiment

As shown in FIG. 21, a mobile station 41 is connected to a network through a base station 51 and a base station control device 61. A radio transmission path connects the mobile station 41 and base station 51, and a transmission line (an optical fiber, a metal cable or a radio transmission path) connects the base station device 51 and base station control device 61. In this system, the communication resources of the radio transmission path and those of the transmission line are managed by the base station 51 and base station control device 61, respectively.

Although transmitting power, a modulator, a spreading code, a demodulator, a decoder and the like are managed as the communication resources of the radio transmission path, in the following description, attention is focused on the "transmitting power". The transmitting power of each connection is proportional to the data rate of the connection. On the other hand, although a band, a frame-offset, a channel ID and the like are managed as the communication resources of the transmission line, in the following description, attention is focused on the "band".

In order to provide high-speed packet data communications, it is preferable to allocate the maximum possible communication resources to the connection. Therefore, in FIG. 21, when the mobile station 41 attempts to establish a packet data communication connection, the base station control device 61 and base station 51 attempt to allocate the maximum possible transmission line resources and the maximum possible radio resources, respectively, to the connection. However, if the respective amounts of these two types of communication resources are not well balanced, the usability of one type of communication resources degrades. For example, if the base station control device 61 allocates transmission line resources corresponding to 2 Mbps, and base station 51 allocates radio resources corresponding to 1 Mbps, as a result, the transmission line resources corresponding to 1 Mbps are reserved, but unusable.

Therefore, in the mobile communication system of the third embodiment, the base station 51 and base station control device 61 jointly allocate radio resources and transmission line resources, respectively, to each connection. The method for managing communication resources is described below with reference to FIGS. 22 through 29.

Figure 22:
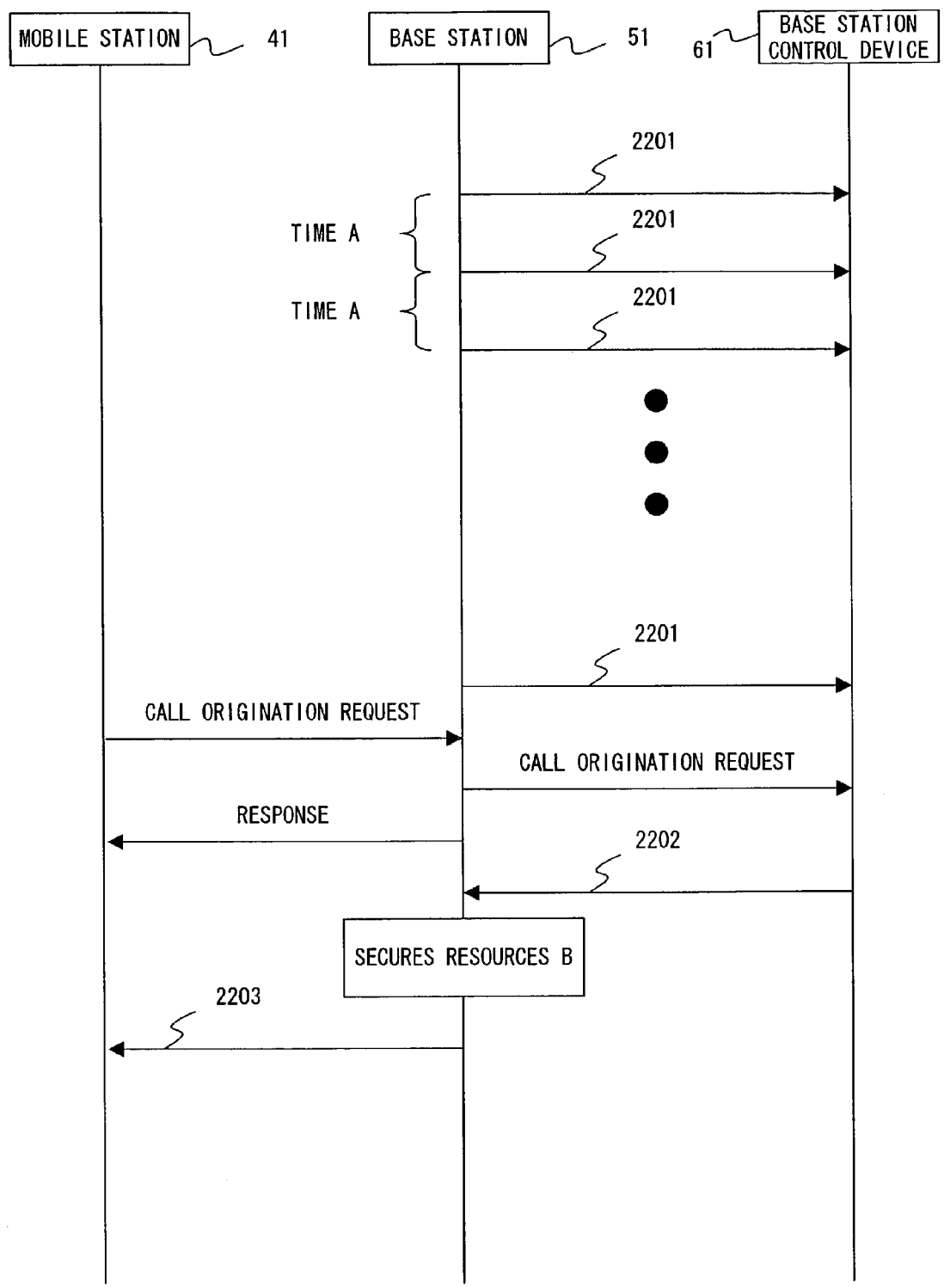
FIGS. 22 through 25 show sequence charts showing processes for allocating communication resources in the mobile communication system of the third embodiment.

FIG. 22 is a sequence chart showing a process for allocating communication resources in the mobile communication system of the third embodiment. In this sequence, the base station 51 periodically notifies the base station control device 61 of information about radio resources, and the communication resources are allocated based on the notices.

Specifically, the base station 51 notifies the base station control device 61 of resource information (2201) in a prescribed cycle (every time period A) regardless of the establishment/release of a call. This resource information (2201) represents available radio resources. In this example, "available radio resources=B" is informed. In this way, the base station control device 61 find outs the amount of radio resources allocable to a new connection. On the other hand, the base station control device 61 manages transmission line resources. Therefore, the base station control device 61 can find out both the transmission line resources and radio resources allocable to a new connection.

When the mobile station 41 originates a call in such a state, the base station 51 detects an origination of a call and notifies the base station control device 61 of the origination of the call. Upon detecting the call originating from the mobile station 41, the base station control device 61 determines an amount of transmission line resource to be allocated to the call within the range of the "amount of the available radio resource" informed by the resource information (2201). Here, the respective dimensions of radio resources and transmission line resources are different. Therefore, the transmitting power as the radio resources and the bandwidth as the transmission line resources are converted, for example, to a "data rate" and the "number of unit channels", respectively. Then, the bandwidth of a transmission line determined by the base station control device 61 is informed to the base station 51 as a resource allocation request (2202).

Upon receipt of the resource allocation request (2202), the base station 51 secures both the transmission line resources and radio resources based on the request. In this case, these two types of resources are the same each other, if they are respectively converted into data rates. Then, the base station 51 transmits a traffic allocation (2203) to the mobile station 41. This traffic allocation (2203) is a message used to notify the mobile station 41 of the radio resource secured by the base station 51.

In this way, in the sequence shown in FIG. 22, the amount of available radio resource is informed to the base station control device 61, and the radio resources and the transmission line resources are allocated based on the notice. Therefore, the allocation of unusable resources can be avoided.

In the sequence shown in FIG. 22, if there are a plurality of call are originated within a cycle where resource information (2201) is informed, an amount of the available radio resource found out by the base station control device 61 and the actual amount of the available radio resource do not match. In the sequence shown in FIG. 23, a process for solving this problem is performed.

The base station 51 periodically notifies the base station control device 61 of resource information (2301). When the mobile station 41 originates a call in this system, the base station control device 61 generates a resource allocation request (2302) based on the resource information (2301) and transmits the request to the base station 51. Here, it is assumed that the actual amount of the available radio resource of the base station 51 is "B", and the amount of the communications resource designated by the resource allocation request (2302) is "C(C<B)". In this case, the base station 51 allocates both "radio resource=C" and "transmission line resource=C" to the new call originated by the mobile station 41 and notifies the mobile station 41 of a traffic allocation (2303). In this way, the mobile station 41 starts communications using "communication resources=C". As a result, the actual amount of the available radio resource of the base station 51 becomes "B-C".

Then, it is assumed that a mobile station 42 originates a call before subsequent resource information is informed to the base station control device 61. In this case, the base station control device 61 generates a resource allocation request (2304) based on the resource information (2301) received before allocating communication resources to the mobile station 41, and transmits the request to the base station 51. Here, it is assumed that an amount of the communications resource designated by the resource allocation request (2304) is "D(B-C<D)".

In this case, the base station 51 cannot secure the amount of the radio resource requested by the resource allocation request (2304). Therefore, the base station 51 issues an allocation refusal (2405) to the base station control device 61. This allocation refusal (2405) includes a message indicating the current actual amount of the available radio resources of the base station 51. In this example, an "available radio resource amount=B-C" is informed.

Upon receipt of the allocation refusal (2405), the base station control device 61 generates a resource allocation request (2306) in response to the refusal and transmits the request to the base station 51. In this case, the amount of the communication resources designated by the resource allocation request (2306) is "B-C". Then, the base station 51 allocates both the "radio resource=B-C" and "transmission line resource=B-C" to the call originated by the mobile station 42, and notifies the mobile station 42 of traffic allocation (2307). In this way, the mobile station 42 starts communications using "communication resources=B-C".

Figure 23:
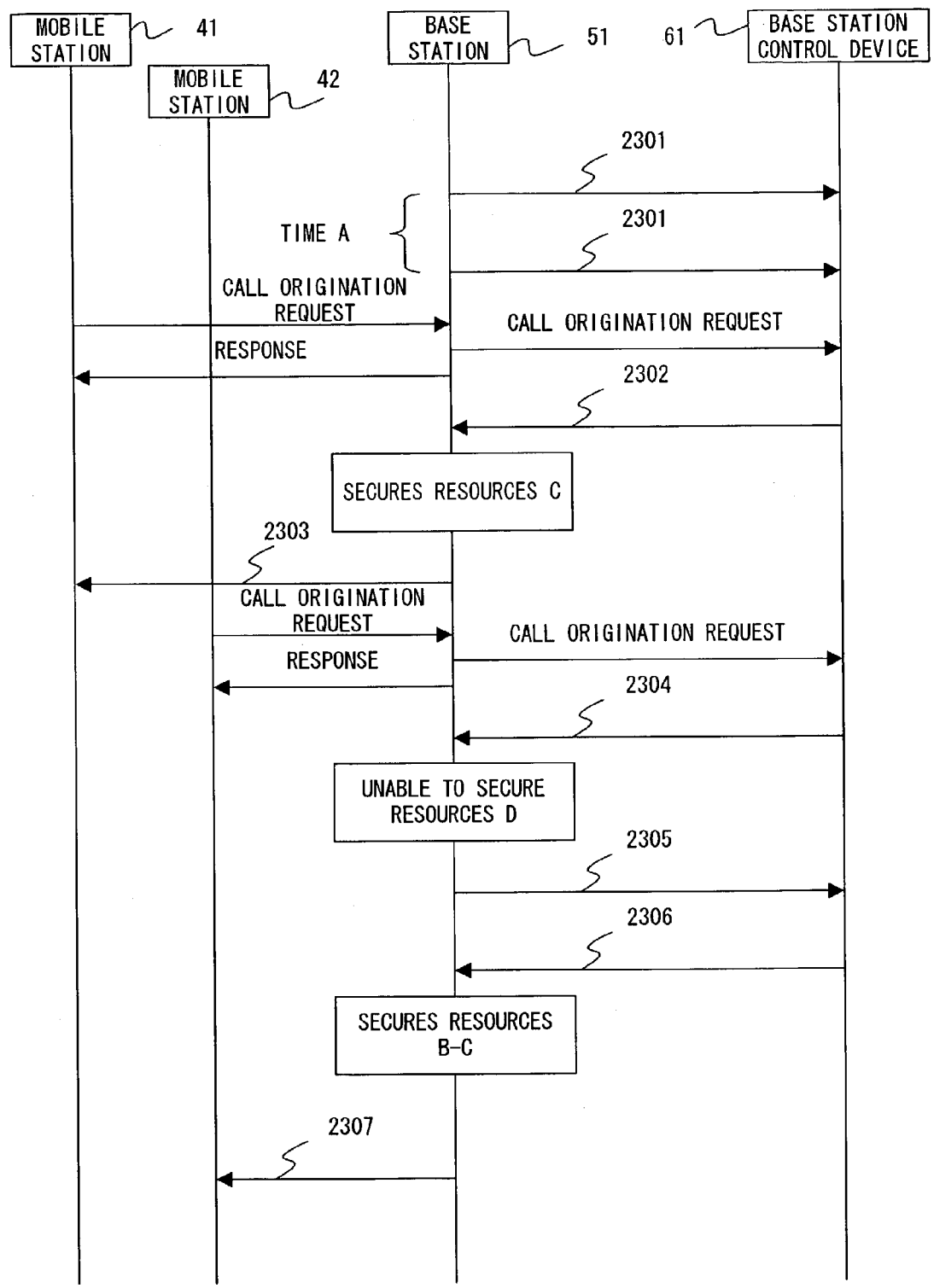
Figure 24:
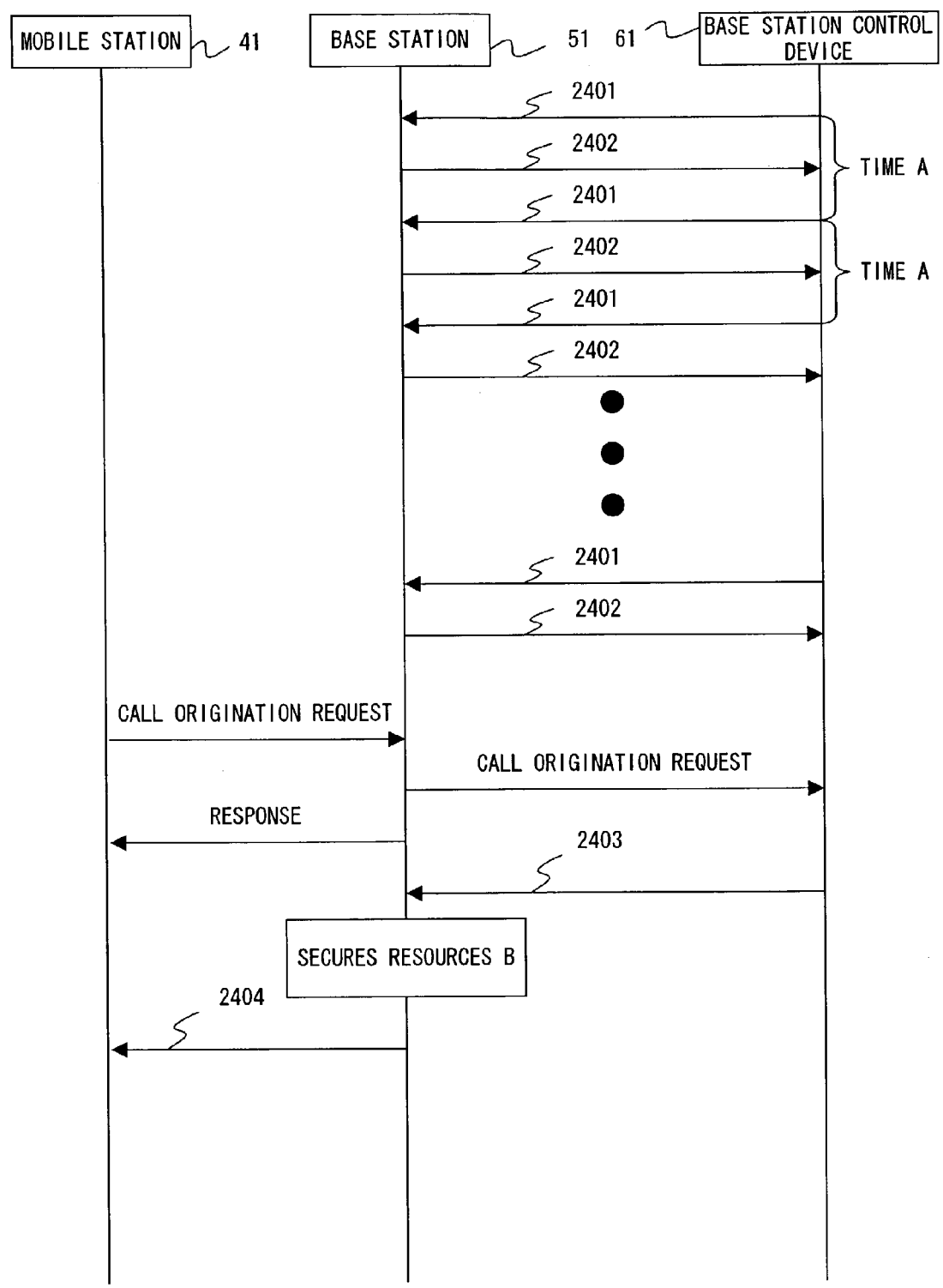
Figure 25:
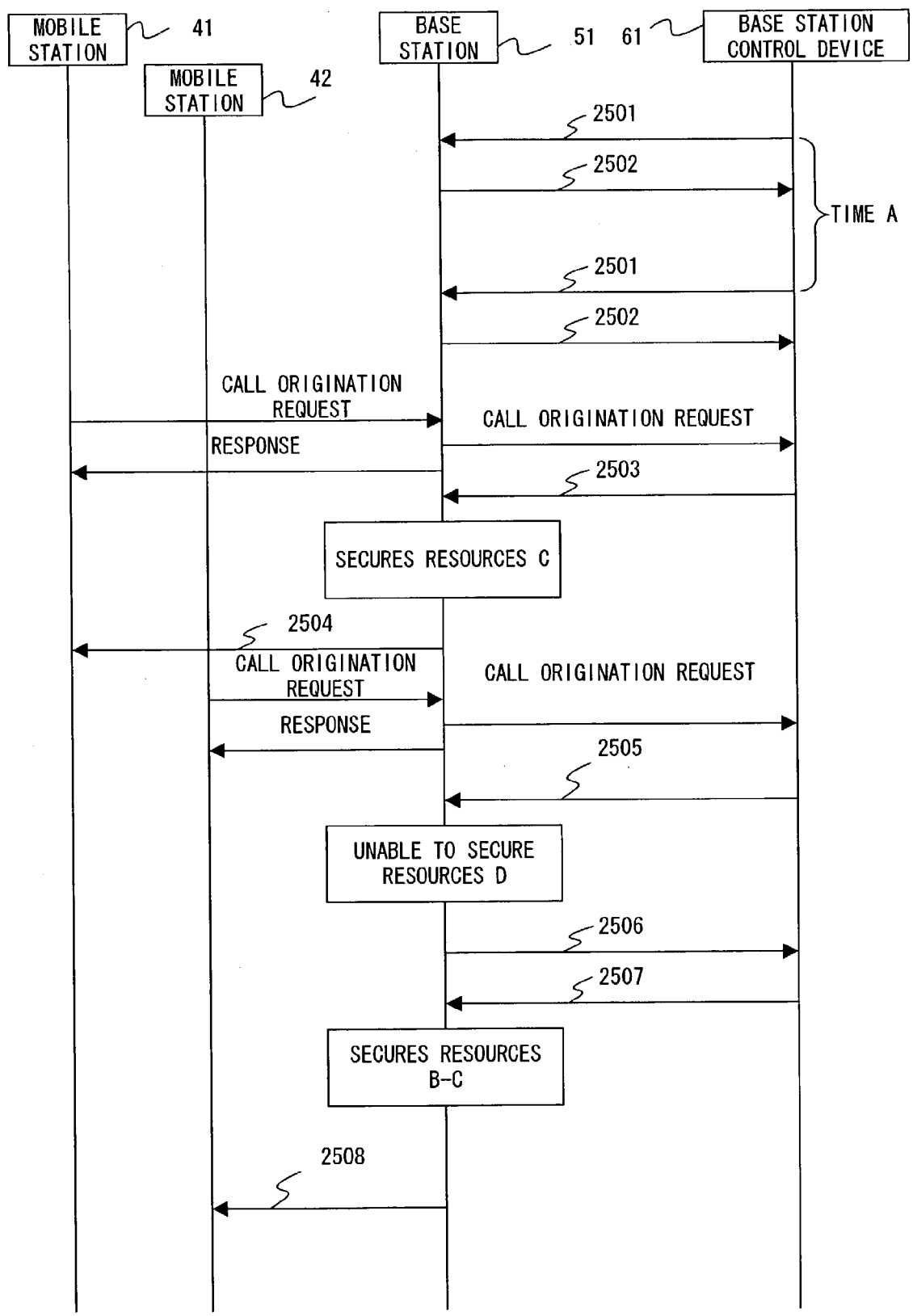

Although in the sequences shown in FIGS. 22 and 23, the base station 51 spontaneously transmits resource information (2201 and 2301) to the base station control device 61, the base station control device 61 can also periodically make an inquiry about available radio resources to the base station 51, as shown in FIGS. 24 and 25. In this case, the base station control device 61 periodically issues a resource inquiry (2401 and 2501) to the base station 51, and the base station 51 returns corresponding resource information (2402 and 2502). The procedure after that is the same as that of the sequence described with reference to FIG. 22 or 23.

Although in the sequences shown in FIGS. 22 through 25, a base station periodically notifies a base station control device of resource information regardless of the establishment/disconnection of a call, the resource information can also be informed using the establishment/disconnection of a call as a trigger. The sequence in the cases where resource information is informed using the establishment/disconnection of a call as a trigger is described below with reference to FIGS. 26 through 29.

Figure 26:
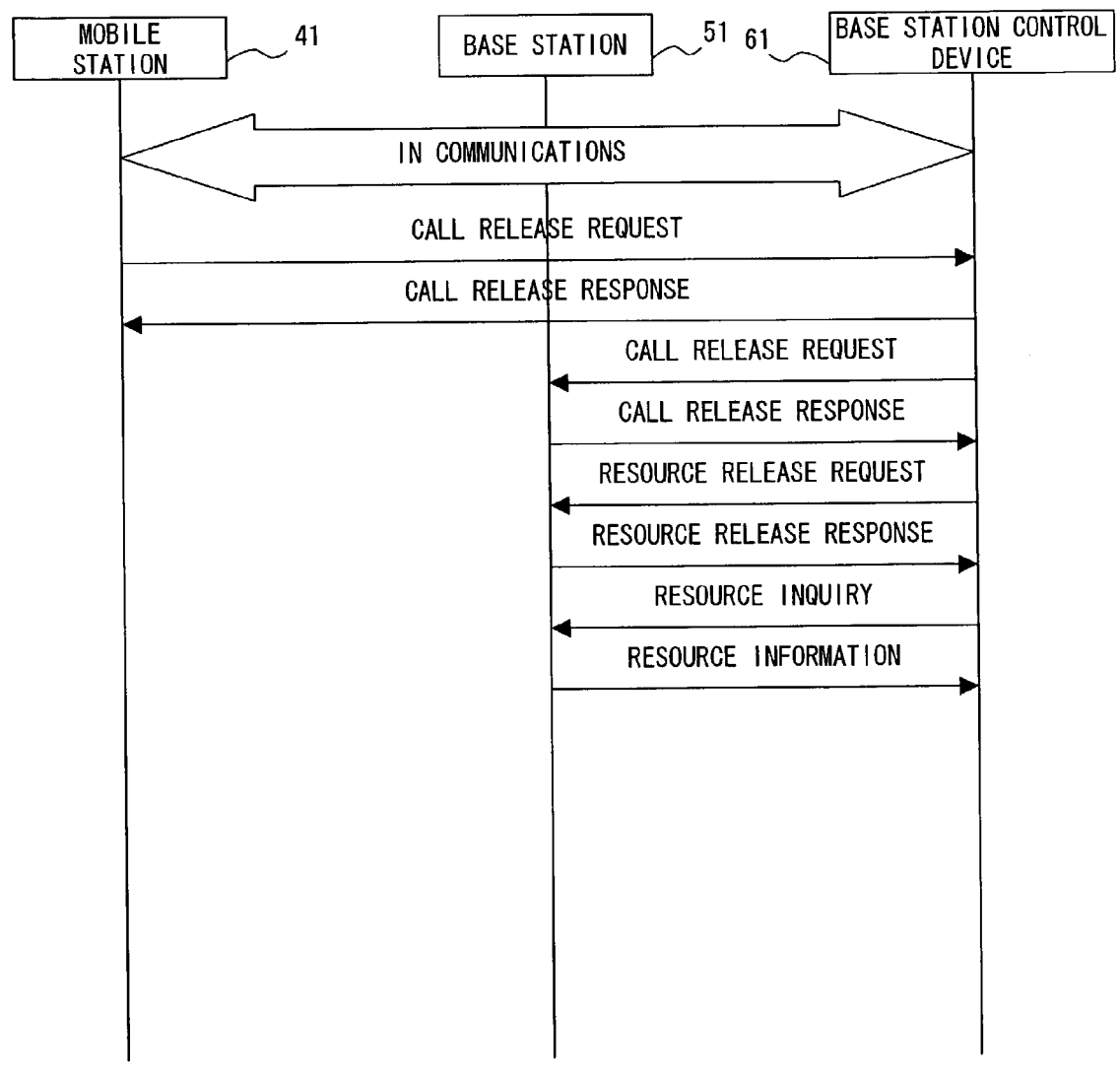
FIGS. 26 through 29 show sequence charts showing processes for managing communication resources in the mobile communication system of the third embodiment.
Figure 27:
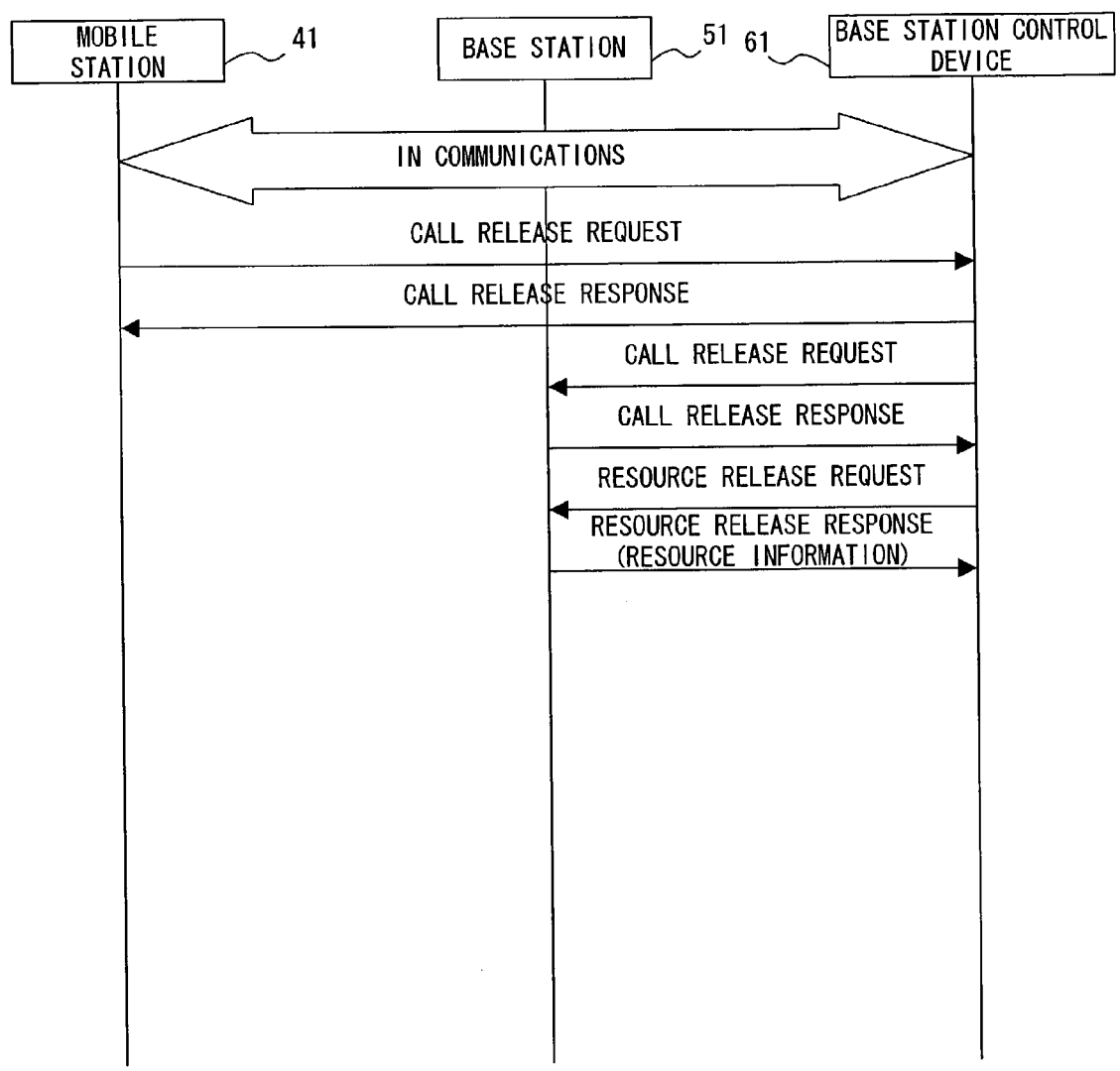

In the sequence shown in FIG. 26, when the mobile station 41 disconnects a call, the mobile station 41 issues' a call release instruction to the base station control device 61 through the base station 51. Upon receipt of this instruction, the base station control device 61 returns a call release response to the mobile station 41 and issues a call release request to the base station 51. In this way, radio resources between the base station 51 and the mobile station 41 are released.

Upon receipt of the call release response, the base station control device 61 issues a resource release request to the base station 51. This resource release request includes an instruction to release transmission line resources between the base station 51 and base station control device 61 that are secured for the mobile station 41. Upon receipt of a resource release response corresponding to the resource release request, the base station control device 61 issues a resource inquiry to the base station 51 to find out the current amount of the available radio resource. Then, the base station 51 transmits corresponding resource information to the base station control device 61. In this way, the base station control device 61 can find out the latest resource information (amount of the available radio resource).

In the example shown in FIG. 26, the base station control device 61 must further issue a resource inquiry after issuing the resource release request in order to obtain the resource information. However, in the sequence shown in FIG. 27, no resource inquiry is needed. Specifically, upon receipt of the resource release request, the base station 51 releases corresponding communication resources and checks the current amount of the available radio resource. Then, the base station 51 stores the result in a resource release response corresponding to the resource release request and returns the response to the base station control device 61. In this way, the base station control device 61 can find out the latest resource information (amount of the available radio resource).

Figure 28:
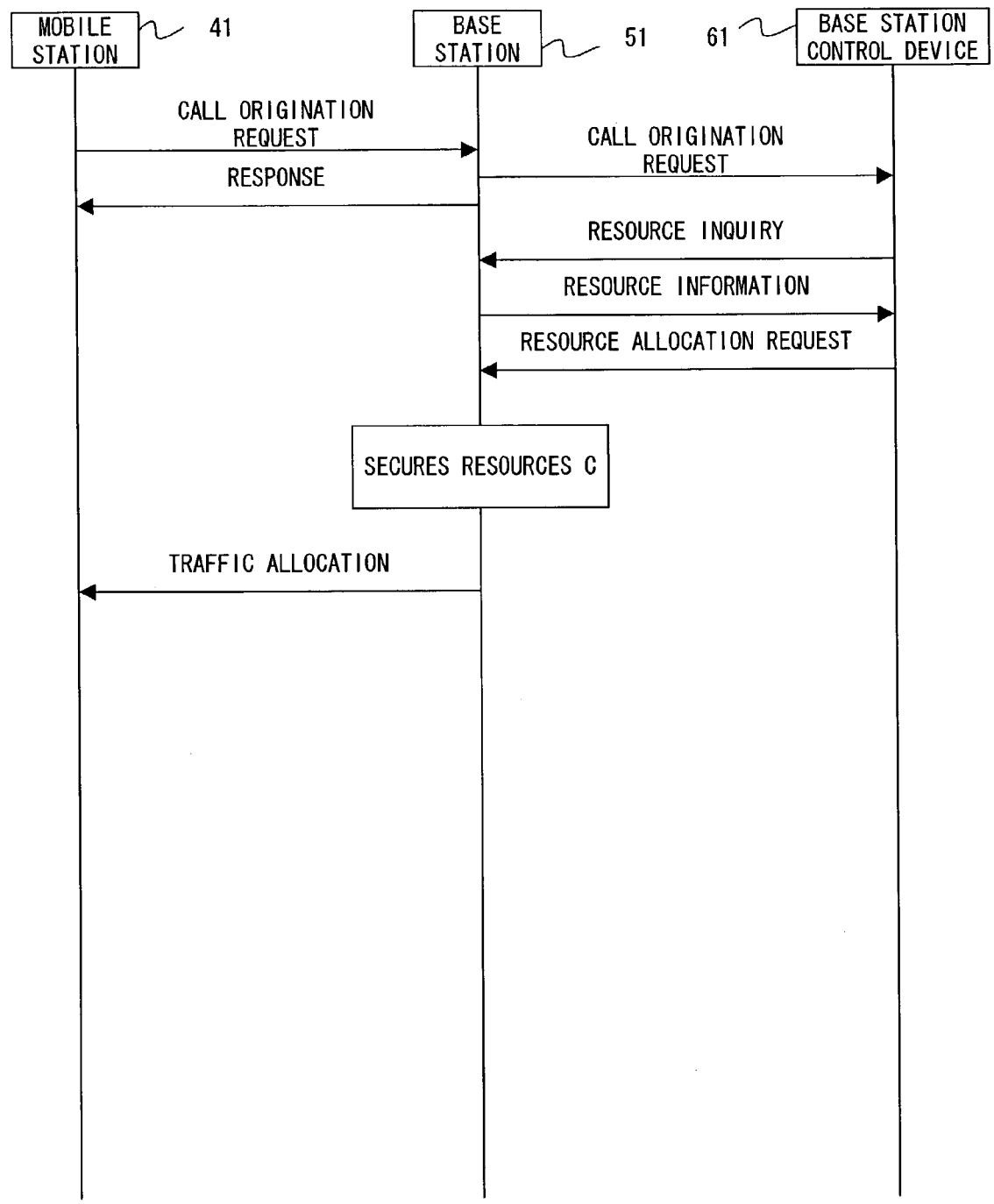
Figure 29:
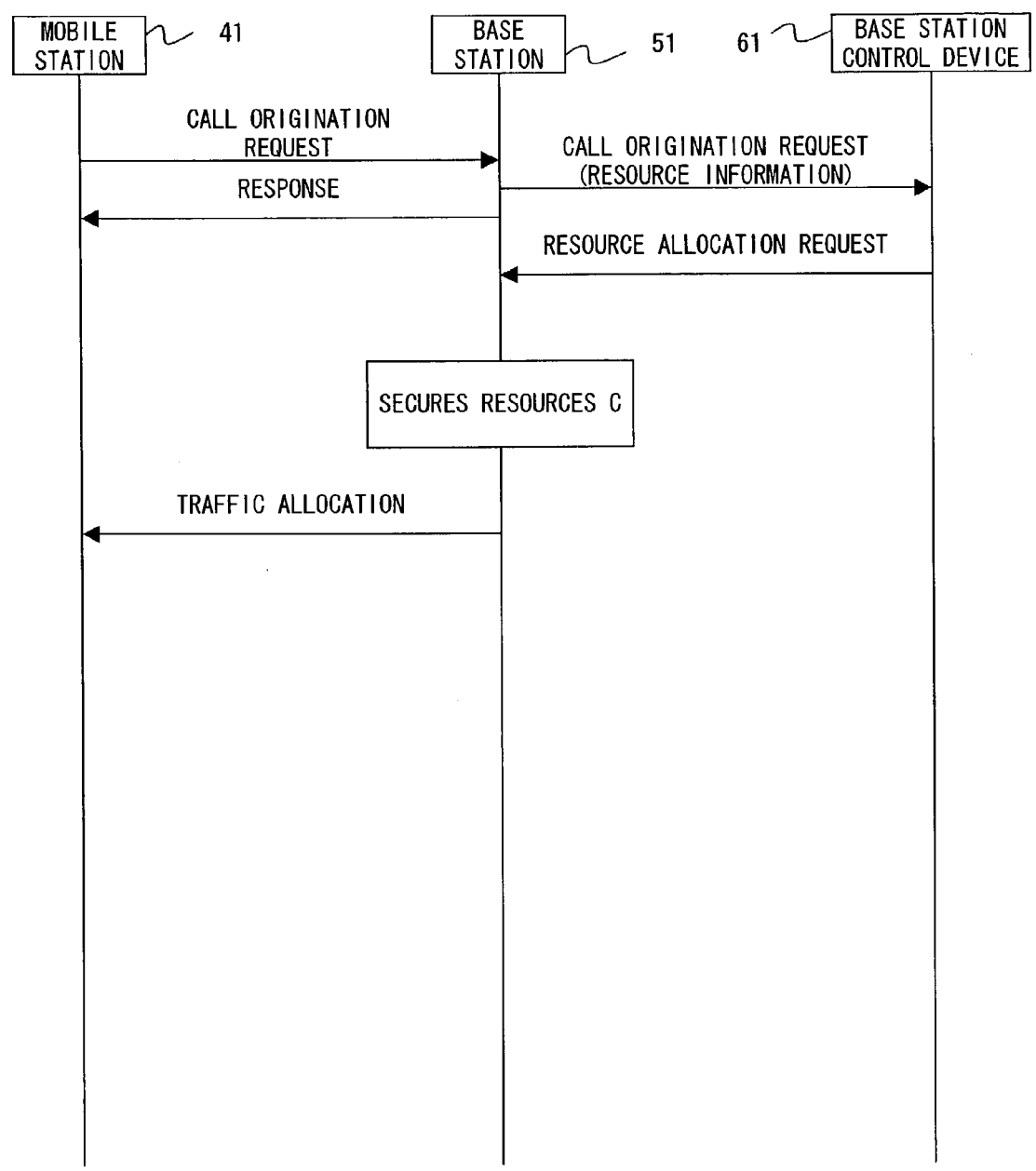

In the sequence shown in FIG. 28, resource information is informed using an origination of a call from the mobile station 41 as a trigger, and communication resources are allocated to the mobile station 41 according to the resource information. Specifically, when the mobile station 41 originates a call, an call origination request is transmitted to the base station control device 61 through the base station 51. Upon receipt of the call origination request, the base station control device 61 makes an inquiry about resource information (amount of the available radio resource) to the base station 51. Then, the base station control device 61 generates a resource allocation request based on the resource information received from the base station 51, and transmits the request to the base station 51.

The base station 51 secures communication resources for the mobile station 41 based on the resource allocation request, and notifies the mobile station 41 of the secured radio resources using a traffic allocation message.

In the sequence shown in FIG. 28, the base station control device 61 must issue a resource inquiry in order to obtain resource information. However, in the sequence shown in FIG. 29, no resource inquiry is needed. Specifically, upon receipt of the call origination request from the mobile station 41, the base station 51 checks the current resource information (amount of the available radio resource). Then, the base station 51 attaches the resource information to the call origination request and transmits the request to the base station control device 61. In this way, the base station control device 61 can find out the latest resource information (amount of the available radio resource).

Although the mobile communication systems of the first through third embodiments are described presuming that CDMA is used in a radio transmission path, the present invention is not limited to CDMA.

In addition, although in several examples amoung the first through third embodiments, hand-off/rate adjustment is performed using a call origination from a mobile station accommodated in a base station as a trigger, the present invention is not limited to this trigger. For example, hand-off/rate adjustment can also be performed using an incoming call to a mobile station accommodated in a base station as a trigger.

What is claimed is:

1. A mobile communication system including a plurality of base stations, comprising:
   a first base station accommodating a mobile station through a radio transmission path;
   a second base station communicative with the mobile station through a radio transmission path;
   a broadcast unit, provided in each of said first and second base station, for broadcasting the resource information to all mobile stations located within the communication area of the relevant base station periodically or when the communication resources managed by the relevant base station are changed;
   a first judgement unit provided in a mobile station, for judging whether a level of radio signal from said second base station exceeds a predetermined signal level threshold; and
   a second judgement unit provided in the mobile station, for judging according to the resource information from said first and second base station whether available communication resources of said second base station are larger than available communication resources of said first base station, wherein
   a hand-off from said first base station to said second base station is performed when a level of radio signal from said second base station exceeds the predetermined signal level threshold and available communication resources of said second base station are lager than available communication resources of said first base station,
   wherein said first judgment unit judges that the hand-off should not be performed, if level of a radio signal transmitted between said second base station and the mobile station is below a prescribed value, and
   wherein the usage of communication resources corresponds to a difference between the maximum transmitting power and a current transmitting power at each of said first and second base station.

2. A mobile communication system including a plurality of base stations, comprising:
   a first base station accommodating a mobile station through a radio transmission path;
   a second base station communicative with the mobile station through a radio transmission path;
   a broadcast unit, provided in each of said first and second base station, for broadcasting the resource information to all mobile stations located within the communication area of the relevant base station periodically or when the communication resources managed by the relevant base station are changed;
   a first judgment unit provided in a mobile station, for judging whether a level of radio signal from said second base station exceeds a predetermined signal level threshold; and
   a second judgment unit provided in the mobile station, for judging according to the resource information from said first and second base station whether available communication resources of said second base station are larger than available communication resources of said first base station, wherein a hand-off from said first base station to said second base station is performed when a level of radio signal from said second base station exceeds the predetermined signal level threshold and available communication resources of said second base station are larger than available communication resources of said first base station, wherein said second judgment unit judges that the hand-off should not be performed, if the quality of a radio transmission path between said second base station and the mobile station is below a prescribed value, and wherein the usage of communication resources corresponds to a difference between the maximum transmitting power and a current transmitting power at each of said first and second base station.

3. A mobile communication system including a plurality of base stations, a base station control device for controlling the plurality of base stations and a mobile station accommodated in an arbitrary base station of the plurality of base stations, wherein each of the plurality of base stations broadcasts resource information to all mobile stations located within the communication area of the relevant base station periodically or when the communication resources managed by the relevant base station are changed, the mobile station judges whether a level of radio signal from a second base station of the plurality of base stations exceeds a predetermined signal level threshold and whether available communication resources of said second base station are larger than available communication resources of a first base station of the plurality of base stations according to resource information received from said first and second base stations, a hand-off from said first base station to said second base station is performed when a level of radio signal from said second base station exceeds the predetermined signal level threshold and available communication resources of said second base station are larger than available communication resources of said first base station, the base station control device requests said first and second base stations to perform hand-off, if the mobile station judges that hand-off should be performed, and said first and second base stations perform hand-off based on the request, wherein said first judgment unit judges that the hand-off should not be performed, if level of a radio signal transmitted between said second base station and the mobile station is below a prescribed value, and wherein the usage of communication resources corresponds to a difference between the maximum transmitting power and a current transmitting power at each of said first and second base station.

4. A mobile station accommodated in an arbitrary base station of a plurality of base stations through a radio transmission path in a mobile communication system including a plurality of base stations and a base station control device for controlling the plurality of base stations, comprising:

a receiving unit receiving resource information from each of the plurality of base stations, said each of the plurality of base stations broadcasting the resource information to all mobile stations located within the communication area of the relevant base station periodically or when the communication resources managed by the relevant base station are changed;

a first judgment unit for judging whether a level of radio signal from a second base station of the plurality of base stations exceeds a predetermined signal level threshold; and a second judgment unit for judging whether available communication resources of said second base station are larger than available communication resources of a first base station of the plurality of base stations according to the resource information received from said first and second base station, wherein a hand-off from said first base station to said second base station is performed when a level of radio signal from said second base station exceeds the predetermined signal level threshold and available communication resources of said second base station are larger than available communication resources of said first base station; and a request unit making a request for hand-off to the base station control device, if said first and second judgment units decide that hand-off should be requested, wherein said first judgment unit judges that the hand-off should not be performed, if level of a radio signal transmitted between said second base station and the mobile station is below a prescribed value, and wherein the usage of communication resources corresponds to a difference between the maximum transmitting power and a current transmitting power at each of said first and second base station.

5. A mobile communication system including a plurality of base stations, a base station control device for controlling the plurality of base stations and a mobile station accommodated in an arbitrary base station of the plurality of base stations, wherein each of the plurality of base stations broadcasts resource information to all mobile stations located within the communication area of the relevant base station periodically or when the communication resources managed by the relevant base station are changed, the mobile station judges whether a level of radio signal from a second base station of the plurality of base stations exceeds a predetermined signal level threshold and whether available communication resources of said second base station are larger than available communication resources of a first base station of the plurality of base stations according to resource information received from said first and second base stations, a hand-off from said first base station to said second base station is performed when a level of radio signal from said second base station exceeds the predetermined signal level threshold and available communication resources of said second base station are larger than available communication resources of said first base station, the base station control device requests said first and second base stations to perform hand-off, if the mobile station judges that hand-off should be performed, and said first and second base stations perform hand-off based on the request, wherein said second judgement unit judges that the hand-off should not be performed, if the quality of a radio transmission path between said second base station and the mobile station is below a prescribed value, and wherein the usage of communication resources corresponds to a difference between the maximum transmitting power and a current transmitting power at each of said first and second base station.

6. A mobile station accommodated in an arbitrary base station of a plurality of base stations through a radio transmission path in a mobile communication system including a plurality of base stations and a base station control device far controlling the plurality of base stations, comprising:

a receiving unit receiving resource information from each of the plurality of base stations, said each of the plurality of base stations broadcasting the resource information to all mobile stations located within the communication area of the relevant base station periodically or when the communication resources managed by the relevant base station are changed;

a first judgment unit for judging whether a level of radio signal from a second base station of the plurality of base stations exceeds a predetermined signal level threshold; and a second judgment unit for judging whether available communication resources of said second base station are larger than available communication resources of a first base station of the plurality of base stations according to the resource information received from said first and second base station, wherein a hand-off from said first base station to said second base station is performed when a level of radio signal from said second base station exceeds the predetermined signal level threshold and available communication resources of said second base station are larger than available communication resources of said first base station; and a request unit making a request for hand-off to the base station control device, if said first and second judgment units decide that hand-off should be requested, where in said second judgment unit judges that the hand-off should not be performed, if the quality of a radio transmission path between said second base station and the mobile station is below a prescribed value, and wherein the usage of communication resources corresponds to a difference between the maximum transmitting power and a current transmitting power at each of said first and second base station.

* * * * *